(12) United States Patent
Chu et al.

(10) Patent No.: US 12,387,880 B2
(45) Date of Patent: Aug. 12, 2025

(54) TERMINATION ELECTRODE COMPOSITE, MULTILAYER CERAMIC ELECTRONIC COMPONENT AND MANUFACTURING METHOD THEREOF

(71) Applicant: WALSIN TECHNOLOGY CORPORATION, Taipei (TW)

(72) Inventors: Li-Wen Chu, Taipei (TW); Chih-Hao Liang, Taipei (TW); I-Shun Huang, Taipei (TW)

(73) Assignee: WALSIN TECHNOLOGY CORPORATION, Taipei (TW)

( * ) Notice: Subject to any disclaimer, the term of this patent is extended or adjusted under 35 U.S.C. 154(b) by 140 days.

(21) Appl. No.: 18/237,999

(22) Filed: Aug. 25, 2023

(65) Prior Publication Data
US 2024/0404758 A1 Dec. 5, 2024

(30) Foreign Application Priority Data
Jun. 1, 2023 (TW) ................................ 112120525

(51) Int. Cl.
*H01G 4/30* (2006.01)
*C04B 35/468* (2006.01)
(Continued)

(52) U.S. Cl.
CPC ............ *H01G 4/30* (2013.01); *C04B 35/468* (2013.01); *C04B 35/64* (2013.01); *H01G 4/008* (2013.01); *H01G 4/012* (2013.01); *H01G 4/2325* (2013.01)

(58) Field of Classification Search
None
See application file for complete search history.

(56) References Cited

U.S. PATENT DOCUMENTS

| 6,344,963 B1* | 2/2002 | Mori ...................... H01G 4/232 361/306.3 |
| 2004/0190221 A1* | 9/2004 | Yamaguchi .............. H01G 4/30 361/306.3 |

(Continued)

FOREIGN PATENT DOCUMENTS

| CN | 115938799 A | 4/2023 |
| TW | 202234427 A | 9/2022 |

*Primary Examiner* — Michael P McFadden
(74) *Attorney, Agent, or Firm* — Birch, Stewart, Kolasch & Birch, LLP

(57) ABSTRACT

The present invention provides a termination electrode composite, comprising a ceramic material, a metal material, a resin and an organic solvent, wherein based on the total amount of the termination electrode composite, the ceramic material is in an amount of 4 weight percent to 12 weight percent, and the metal material is in an amount of 63 weight percent to 71 weight percent. The termination electrode composite of the present invention warrants the multilayer ceramic electronic component using the same have good densification of the termination electrodes and the advantages of simplifying the manufacturing process and being cost-effective. The present invention further provides a multilayer ceramic electronic component with good connection between the internal electrodes and the termination electrodes, and a manufacturing method thereof, which comprises a co-sintering step resulting in the advantages of simplifying the manufacturing process and being cost-effective.

17 Claims, 6 Drawing Sheets

(51) Int. Cl.
  *C04B 35/64* (2006.01)
  *H01G 4/008* (2006.01)
  *H01G 4/012* (2006.01)
  *H01G 4/232* (2006.01)

(56) References Cited

U.S. PATENT DOCUMENTS

| | | | |
|---|---|---|---|
| 2015/0318111 A1* | 11/2015 | Lee | H01G 4/2325 |
| | | | 29/25.03 |
| 2016/0189865 A1* | 6/2016 | Kawamura | H01G 4/012 |
| | | | 361/301.4 |
| 2017/0037271 A1* | 2/2017 | Kobayashi | C09D 11/033 |
| 2019/0180938 A1* | 6/2019 | Tahara | H01G 4/248 |
| 2019/0259537 A1* | 8/2019 | Teraoka | H01G 4/1227 |

* cited by examiner

TERMINATION ELECTRODE COMPOSITE, MULTILAYER CERAMIC ELECTRONIC COMPONENT AND MANUFACTURING METHOD THEREOF

CROSS-REFERENCE TO RELATED APPLICATION

Pursuant to 35 U.S.C. § 119 (a), this application claims the benefits of the priority to Taiwan Patent Application No. 112120525, filed on Jun. 1, 2023, which is incorporated by reference herein by its entirety.

BACKGROUND OF THE INVENTION

1. Field of the Invention

The present invention relates to a termination electrode composite. The present invention further relates to a multilayer ceramic electronic component adopting the termination electrode composite, and a manufacturing method thereof.

2. Description of the Prior Arts

Electronic ceramics comprise multilayer ceramic capacitors (MLCC), inductors, resistors and other passive components, and have the advantage of small size, thereby bringing in a wide application in the fields of automobiles, televisions, computers and mobile communications, etc.

The electronic ceramics have a complex structure and comprise ceramic layers, internal electrodes and termination electrodes, so properly combining ceramic layers, internal electrodes and terminal electrodes becomes an important issue for manufacturing electronic ceramics. The traditional method for manufacturing electronic ceramics is that the ceramic body of the electronic ceramic is firstly obtained after sintering, and then the termination electrode composite is provided to the ceramic body to form termination electrodes by another sintering step, so that the termination electrodes electrically connect to the ceramic body. Further, the traditional termination electrode composition requires a glass material to serve as a sintering agent. The reason is that the glass material will form a liquid phase during sintering, which facilitates the liquid phase sintering reaction or the formation of a low-temperature eutectic phase in the termination electrodes, so that the termination electrodes undergo a consolidation process and connect to the ceramic body, which comprises internal electrodes, to form a complete circuit with the internal electrodes. Therefore, the traditional method for the preparation of electronic ceramics requires two-stage sintering steps to connect ceramic layers, internal electrodes and termination electrodes, and the manufacturing process is complex and time-consuming.

Further, China patent CN101658929B is provided as another example, which discloses a modified copper-nickel alloy powder for the termination electrodes of the multilayer ceramic capacitors. The modified copper-nickel alloy powder comprises a copper-nickel alloy powder A and a copper-nickel alloy powder B, wherein the copper-nickel alloy powder A is a spherical copper-nickel alloy powder with a particle diameter of 0.1 μm to 0.8 μm prepared by physical vapor deposition. The copper-nickel alloy powder B is a flaky copper-nickel alloy powder prepared by flattening the copper-nickel alloy powder A under pressure through a grinder. Therefore, the copper-nickel alloy powders A and B can increase both the contact area and the connection between the termination electrode and the internal electrode layers for enhancing the weldability of the termination electrode, so that the multilayer ceramic capacitor is not prone to cracking, and the quality thereof is improved. Nonetheless, the adaptation of physical vapor deposition is costly.

Therefore, a more cost-effective method for the preparation of electronic ceramics is an important issue yet to be developed.

SUMMARY OF THE INVENTION

To solve the aforementioned issue, the present invention provides a termination electrode composite, comprising a ceramic material, a metal material, a resin and an organic solvent, wherein based on the total amount of the termination electrode composite, the ceramic material is in an amount of 4 weight percent to 12 weight percent, the metal material is in an amount of 63 weight percent to 71 weight percent, the resin is in an amount of 1.3 weight percent to 11.5 weight percent, and the organic solvent is in an amount of 13 weight percent to 25 weight percent.

According to the present invention, even a glass material as a sintering agent is not adopted, a multilayer ceramic electronic component with good densification can still be obtained by adjusting the content of both the ceramic material and the metal material in the termination electrode composite. Therefore, the present invention has the advantages of the simplified manufacturing process and lowered cost thereof.

Further, the traditional termination electrode composite comprises a glass material as a sintering agent, which easily brings the issues of glass aggregation on the surface of or blisters in the termination electrodes, and results in the issues as follows: (1) the connection between the termination electrodes and internal electrodes is hindered; (2) the interface structure between the termination electrodes and the ceramic body is damaged; (3) the termination electrodes have structural defects of bubbles (blisters); and (4) the termination electrodes have poor plating when further conductive layers are to be stacked.

In contrast, the termination electrode composite of the present invention does not require a glass material, therefore free from glass aggregation or blisters. Further, the termination electrode composite of the present invention has the advantages as follows:

(1) the termination electrodes will not excessively contract after sintering to further incur cracking of the ceramic body; (2) the multilayer ceramic electronic component has no interface separation issues between the termination electrodes and the ceramic body; (3) the multilayer ceramic electronic component has good connection between internal electrodes and the termination electrodes, good continuity degree of three-layer external electrodes, good weldability degree of three-layer external electrodes, high tensile strength of the capacitors and low coefficient of variation of the capacitance value.

Preferably, based on the total amount of the termination electrode composite, the ceramic material is in an amount of 4 weight percent to 12 weight percent, for example, 4 weight percent, 5 weight percent, 6 weight percent, 7 weight percent, 8 weight percent, 9 weight percent, 10 weight percent, 11 weight percent or 12 weight percent; the metal material is in an amount of 63.75 weight percent to 70 weight percent, for example, 63.75 weight percent, 64 weight percent, 66 weight percent, 67.5 weight percent, 68 weight percent or 70 weight percent; the resin is in an amount of 1.5 weight percent to 11 weight percent, for example, 1.5 weight percent, 3 weight percent, 5 weight percent, 7 weight percent, 7.5 weight percent, 10 weight percent or 11 weight percent; and the organic solvent is in an amount of 14 weight percent to 23.5 weight percent, for example, 14 weight percent, 15 weight percent, 18 weight percent, 20 weight percent, 22 weight percent or 23.5 weight percent.

More preferably, based on the total amount of the termination electrode composite, the ceramic material is in an amount of 7 weight percent to 8 weight percent; the metal material is in an amount of 67 weight percent to 68 weight percent; the resin is in an amount of 6 weight percent to 8 weight percent; and the organic solvent is in an amount of 16 weight percent to 19 weight percent.

In one embodiment, the ceramic material comprises barium titanium oxide, calcium zirconium oxide or a combination thereof.

Preferably, the barium titanium oxide comprises $BaTiO_3$, $BaTi_4O_9$, $Ba_2Ti_9O_{20}$ or any combination thereof.

Preferably, the calcium zirconium oxide comprises (SrCa)(ZrTi)$O_3$, $CaZrO_3$ or a combination thereof.

In one embodiment, the metal material comprises a base metal material. Preferably, the base metal material comprises copper, nickel or a combination thereof.

In one embodiment, the base metal material comprises a copper-nickel alloy, and based on the total amount of the metal material, the copper is in an amount of more than 0 weight percent to less than 100 weight percent, for example, 1 weight percent, 10 weight percent, 25 weight percent, 50 weight percent, 75 weight percent, 90 weight percent or 99 weight percent; and the nickel is in an amount of more than 0 weight percent to less than 100 weight percent, for example, 1 weight percent, 10 weight percent, 25 weight percent, 50 weight percent, 75 weight percent, 90 weight percent or 99 weight percent.

In one embodiment, the metal material is in a form of particles. Preferably, the metal material has a median particle size (D50) of 0.5 μm to 10 μm. More preferably, the metal material has a median particle size (D50) of 1 μm to 5 μm. The median particle size (D50) refers to the particle diameter corresponding to the 50% point of the particle in the cumulative diameter distribution of the particles.

In one embodiment, the metal material is in a form of flakes. Preferably, the metal material has a longest diameter of 2 μm to 10 μm.

In one embodiment, the ceramic material is powders, and the ceramic material has a median particle size (D50) of 50 nm to 1000 nm. Preferably, the ceramic material has a median particle size (D50) of 230 nm to 260 nm.

According to the present invention, the ranges of both the median particle size (D50) and the longest diameter of the metal material facilitate increasing the dispersion uniformity of the metal material and the ceramic material in the termination electrode composite.

In one embodiment, the resin comprises an acrylic resin, an ethyl cellulose resin or a combination thereof.

Preferably, the acrylic resin comprises poly(methyl acrylate) (PMA), poly(ethyl acrylate) (PEA), poly(methyl methacrylate) (PMMA), poly(ethyl methacrylate) (PEMA) or any combination thereof.

Preferably, the ethyl cellulose resin comprises ethyl cellulose.

In one embodiment, the termination electrode composite further comprises a thixotropic agent, a dispersant, a defoaming agent, a leveling agent or any combination thereof.

Preferably, the thixotropic agent comprises a polyamide wax. The termination electrode composite of the present invention can further comprise the thixotropic agent for adjusting the viscosity of the termination electrode composite.

Preferably, the dispersant comprises a polyether phosphate. The termination electrode composite of the present invention can further comprise the dispersant for adjusting the viscosity of the termination electrode composite.

Preferably, the defoaming agent comprises a vinyl polymer. The termination electrode composite of the present invention can further comprise the defoaming agent, so that the termination electrode composite can carry out deaeration by itself to reduce the risk of forming bubbles during the formation of the termination electrodes from the termination electrode composite.

Preferably, the leveling agent comprises a silicone additive with an alkylaryl group. The termination electrode composite of the present invention can further comprise the leveling agent for improving the surface flatness of the termination electrode composite.

In one embodiment, the organic solvent comprises an alcohol, an ether, an ester, an aromatic hydrocarbon or any combination thereof.

Preferably, the alcohol comprises terpineol, cyclohexanemethanol, benzyl alcohol, 2-ethyl-1-hexanol, 1-octanol or any combination thereof.

In one embodiment, the terpineol comprises dihydroterpineol.

Preferably, the ether comprises ethylene glycol monobutyl ether, diethylene glycol monobutyl ether, diethylene glycol monoethyl ether or any combination thereof.

The diethylene glycol monoethyl ether is also called carbitol.

Preferably, the ester comprises terpinyl dihydroacetate, terpinyl acetate, ethylene glycol diacetate, 2-(2-ethoxyethoxy)ethyl acetate or any combination thereof.

The present invention further provides a multilayer ceramic electronic component, comprising:

a ceramic body, comprising a top ceramic layer and a stacked structure with ceramic-electrode alternating layers; wherein the top ceramic layer is disposed on top of the stacked structure with ceramic-electrode alternating layers, and the stacked structure with ceramic-electrode alternating layers comprises multiple ceramic-electrode layers stacked on each other, and the multiple ceramic-electrode layers each comprise a middle ceramic layer and an internal electrode, and the internal electrode is disposed on top of the middle ceramic layer; and two termination electrodes, respectively disposed on opposite sides of the ceramic body, wherein the two termination electrodes electrically connect to the internal electrode of the multiple ceramic-electrode layers; and the two termination electrodes each comprise a metal material, a ceramic material and a sintering agent, and based on the total amount of any one of the two termination electrodes, the metal material is in an amount of 83.5 weight percent to 93 weight percent, the ceramic material is in an amount of 6.5 weight percent to 16 weight percent, and the sintering agent is in an amount of more than 0 weight percent to less than 3 weight percent.

First, although the termination electrode composite of the present invention does not comprise a sintering agent, the sintering agent in the ceramic body can flow to the termination electrodes by capillarity action to facilitate the liquid phase sintering reaction or the formation of a low-temperature eutectic phase in the termination electrodes, so that the termination electrodes undergo a consolidation process to enhance the connection between the termination electrodes and the ceramic body.

Second, the multilayer ceramic electronic component of the present invention has good connection between the internal electrodes and the termination electrodes, and has the advantage of high conductivity, so as to reduce power loss during transmission and heat generation of the multilayer ceramic electronic component, thereby reducing the risk of affecting the reliability of the multilayer ceramic electronic component.

Third, the termination electrodes of the present invention have a stable interface connection with the ceramic body, and can reduce the risk that the termination electrodes would fall off due to the vibration and thermal stress during use, thereby further reducing the functional failure risk of the multilayer ceramic electronic component.

Fourth, the termination electrodes of the present invention have good densification, and can reduce the risk of poor contact or short circuit resulting from hot air solder leveling or insufficient reflow soldering at the termination electrodes or the external electrodes of the multilayer ceramic electronic component during the soldering process of the multilayer ceramic electronic component.

Preferably, based on the total amount of any one of the two termination electrodes, the metal material is in an amount of 85 weight percent to 90 weight percent, for example, 85 weight percent, 87 weight percent, 89 weight percent or 90 weight percent; the ceramic material is in an amount of 7 weight percent to 15 weight percent, for example, 7 weight percent, 9 weight percent, 10 weight percent, 12 weight percent, 14 weight percent or 15 weight percent; and the sintering agent is in an amount of more than 0 weight percent to less than 2 weight percent, for example, more than 0 weight percent to less than 0.05 weight percent, more than 0 weight percent to less than 0.1 weight percent, more than 0 weight percent to less than 0.5 weight percent, more than 0 weight percent to less than 1 weight percent, or more than 0 weight percent to less than 2 weight percent.

Preferably, the total amount of any one of the two termination electrodes indicates that only the total amount of one single termination electrode is calculated, and the single termination electrode refers to the electrode which directly contacts and connects to the internal electrodes, and does not comprise the additional electrode layer which does not directly contact or connect to the internal electrodes.

In one embodiment, the termination electrodes of the multilayer ceramic electronic component are further added with at least one electrode layer to collectively form an external electrode. Preferably, the external electrode is a three-layer external electrode, and the three-layer external electrode sequentially comprises the termination electrode, a nickel layer and a tin layer from the inside of the multilayer ceramic electronic component.

In one embodiment, the ceramic body comprises multiple crystals, and the multiple crystals have a length of 0.01 inches to 0.12 inches; and the multiple crystals have a width of 0.005 inches to 0.1 inches. Preferably, the multiple crystals have a size of 0.12 inches*0.1 inches, 0.12 inches*0.06 inches, 0.08 inches*0.05 inches, 0.04 inches*0.02 inches, 0.02 inches*0.01 inches, 0.01 inches*0.005 inches or any combination thereof. More preferably, the multiple crystals have a size of 0.01 inches*0.005 inches.

In one embodiment, the internal electrode comprises a base metal ingredient. Preferably, the base metal ingredient comprises copper, nickel or a combination thereof.

In one embodiment, the ceramic body further comprises a bottom ceramic layer, and the stacked structure with ceramic-electrode alternating layers is disposed on top of the bottom ceramic layer.

The present invention further provides a manufacturing method for a multilayer ceramic electronic component, comprising:
  a preparation step for a green ceramic body: shaping a ceramic slurry into multiple green ceramic thin layers, and the multiple green ceramic thin layers comprising a top green ceramic layer and multiple middle green ceramic layers; wherein the ceramic slurry comprises a ceramic body composite, and the ceramic body composite comprises a ceramic ingredient and a sintering agent;
  disposing a green internal electrode on top of each of the middle green ceramic layers respectively to obtain multiple green ceramic-electrode layers;
  stacking the multiple green ceramic-electrode layers to obtain a green stacked structure with ceramic-electrode alternating layers;
  disposing the top green ceramic layer on top of the green stacked structure with ceramic-electrode alternating layers to obtain the green ceramic body;
  a step for disposing green termination electrodes: disposing the aforementioned termination electrode composite on opposite sides of the green ceramic body respectively to form the green termination electrodes, thereby obtaining a green body; and
  a co-sintering step: heating the green body at 900° C. to 1400° C. to obtain the multilayer ceramic electronic component.

The manufacturing method for a multilayer ceramic electronic component of the present invention adopts the co-sintering step, which heats the green body, that is, heating the green ceramic body and the green termination electrodes simultaneously, and is different from the two-stage sintering steps for the green ceramic body and the green termination electrodes, respectively. Therefore, the manufacturing method for a multilayer ceramic electronic component of the present invention has the advantages of simplifying the manufacturing process, conserving energy, reducing carbon emission and being cost-effective.

In one embodiment, based on the total amount of the ceramic body composite, the ceramic ingredient is in an amount of 90 weight percent to 99 weight percent, and the sintering agent is in an amount of 1 weight percent to 10 weight percent.

In one embodiment, the ceramic ingredient comprises barium titanium oxide, calcium zirconium oxide or a combination thereof.

Preferably, the barium titanium oxide comprises $BaTiO_3$, $BaTi_4O_9$ or a combination thereof.

Preferably, the calcium zirconium oxide comprises $(SrCa)(ZrTi)O_3$, $CaZrO_3$ or a combination thereof.

In one embodiment, the ceramic ingredient of the ceramic body composite is the same as or different from the ceramic material of the termination electrode composite.

In one embodiment, the sintering agent comprises silicon dioxide. Preferably, the sintering agent further comprises a metal oxide, a metalloid oxide or a combination thereof.

In one embodiment, the metal oxide comprises $MoO_3$, $BaO$, $Al_2O_3$, $CaO$, $MgO$ or any combination thereof.

In one embodiment, the metalloid oxide comprises $B_2O_3$.

In one embodiment, the sintering agent comprises BaO—$Al_2O_3$—$SiO_2$, CaO—$Al_2O_3$—$SiO_2$, MgO—$Al_2O_3$—$SiO_2$, BaO—MgO—$Al_2O_3$—$SiO_2$, CaO—MgO—$Al_2O_3$—$SiO_2$, BaO—CaO—$MoO_3$—MgO—$Al_2O_3$—$SiO_2$, CaO—MnO—$B_2O_3$—$SiO_2$, BaO—ZnO—$B_2O_3$—$SiO_2$ or any combination thereof.

In one embodiment, the green internal electrode comprises a base metal ingredient. Preferably, the base metal ingredient comprises copper, nickel or a combination thereof.

In one embodiment, the green internal electrode is disposed on top of each of the middle green ceramic layers in continuous patterns, discontinuous patterns or floating patterns.

The difference between the continuous style and the discontinuous style is as follows: For the internal electrodes on the same plane, the internal electrode of a continuous style is a single piece, while the internal electrode of a discontinuous style is divided into multiple pieces, and the multiple pieces are not in direct contact with each other.

The difference between the continuous style and the floating style is as follows: One of the two ends of the internal electrode of the continuous style extends to one side of the ceramic body, and the two adjacent internal electrodes, for example, that on the upper layer and that on the lower layer, extend to the opposite sides of the ceramic body, respectively.

In contrast, the two adjacent internal electrodes of the floating style are illustrated as follows: (1) the internal electrode on the first plane is divided into two pieces, and each piece extends to the opposite sides of the ceramic body; wherein each piece is not in direct contact with each other; (2) the internal electrode on the second plane is a single piece, and the single piece does not extend to any side of the ceramic body. Further, the side of the ceramic body refers to the plane to be provided with the termination electrodes.

In one embodiment, any one of the multiple green ceramic thin layers has a thickness of 2 μm to 10 μm.

In one embodiment, the multiple green ceramic thin layers further comprise a bottom green ceramic layer, and the green stacked structure with ceramic-electrode alternating layers is disposed on top of the bottom green ceramic layer.

In one embodiment, the co-sintering step comprises a burning out step and a sintering step; wherein the burning out step comprises heating the green body at 300° C. to 400° C. for 10 hours to 14 hours to obtain a primary body; and the sintering step comprises heating the primary body at 900° C. to 1400° C. for 1 hour to 3 hours to obtain the multilayer ceramic electronic component.

Preferably, the heating temperature of the burning out step and/or the sintering step is a stable heating temperature.

Preferably, the heating temperature in the burning out step is 340° C. to 360° C.

Preferably, the heating time in the burning out step is 11 hours to 13 hours.

Preferably, the heating temperature in the sintering step is 940° C. to 1360° C.

Preferably, the heating time in the sintering step is 1.5 hours to 2.5 hours.

In one embodiment, the sintering step is carried out in a sintering atmosphere. Preferably, the sintering atmosphere comprises nitrogen, hydrogen and oxygen, and the oxygen is in an amount of 5 ppm to 100 ppm. More preferably, when the metal material of the termination electrode composite comprises coppers, the sintering step is carried out in the sintering atmosphere.

To sum up, the termination electrode composite of the present invention does not require a glass material as the sintering agent, and has the advantages of the simplified manufacturing process and reduced cost. The multilayer ceramic electronic component of the present invention has the advantages that (1) the termination electrodes have a good connection with the internal electrodes; (2) the termination electrodes have a stable interface connection with the ceramic body; and (3) the termination electrodes have good densification. Therefore, the multilayer ceramic electronic component of the present invention has good reliability. Finally, the manufacturing method for a multilayer ceramic electronic component of the present invention adopts the co-sintering step, which heats the green body, i.e., heating the green ceramic body and the green termination electrodes simultaneously, thereby having the advantages of the simplified manufacturing process and cost-effectiveness.

DETAILED DESCRIPTION OF THE PREFERRED EMBODIMENTS

The present invention is further explained through the following embodiments. A person having ordinary skill in the art can easily understand the advantages and efficacies achieved by the present invention. The present invention should not be limited to the contents of the embodiments. A person having ordinary skill in the art can make some improvement or modifications which are not departing from the spirit and scope of the present invention to practice or apply the content of the present invention.

I. Example 1-1

Capacitors

1. The Structure of the Multilayer Ceramic Electronic Component

Figure 1:
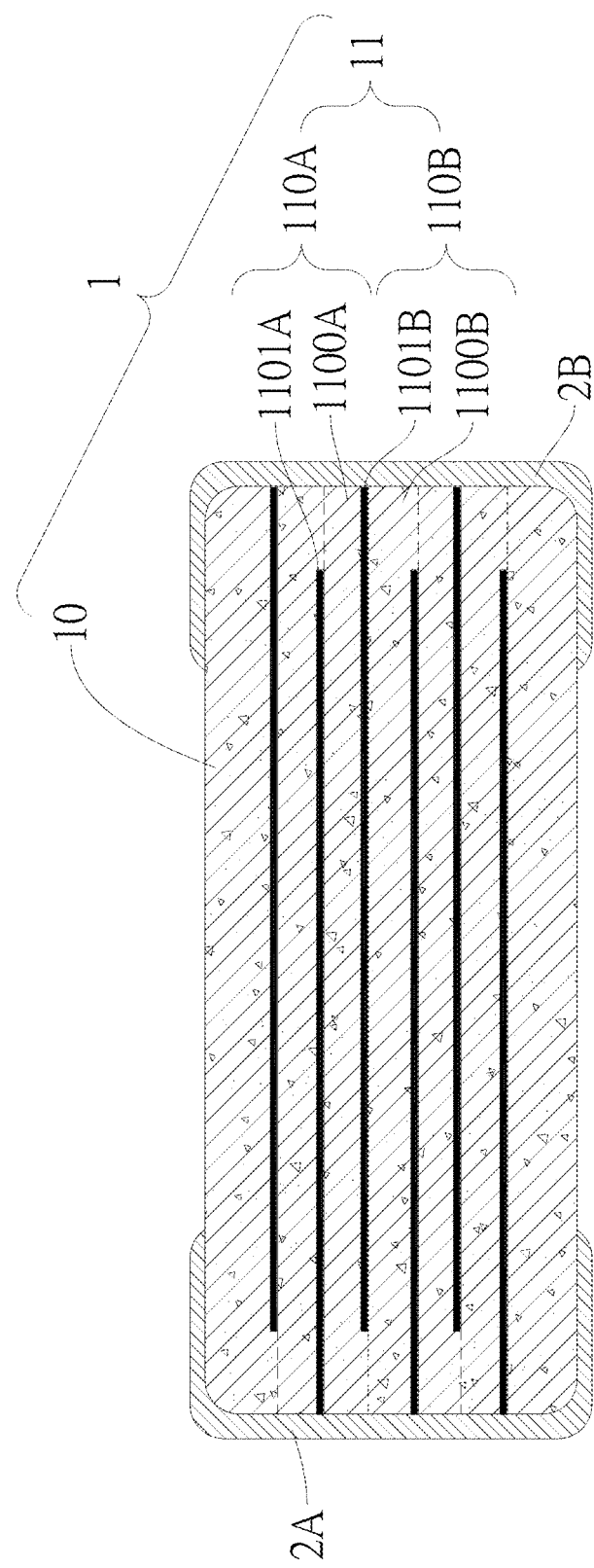
FIG. 1 is a cross-sectional schematic structural diagram of the multilayer ceramic electronic component of the present invention.

The multilayer ceramic electronic component is a capacitor as shown in FIG. 1, comprising: a ceramic body 1 and two termination electrodes 2A, 2B. The ceramic body 1 comprises a top ceramic layer 10 and a stacked structure with ceramic-electrode alternating layers 11, and the top ceramic layer 10 is disposed on top of the stacked structure with ceramic-electrode alternating layers 11; wherein the stacked structure with ceramic-electrode alternating layers 11 comprises multiple ceramic-electrode layers 110A, 110B stacked on each other, and the multiple ceramic-electrode layers 110A, 110B each comprise a middle ceramic layer 1100A, 1100B and an internal electrode 1101A, 1101B, and the internal electrode 1101A is disposed on top of the middle ceramic layer 1100A, and the internal electrode 1101B is disposed on top of the middle ceramic layer 1100B. The two termination electrodes 2A, 2B are respectively disposed on opposite sides of the ceramic body 1, and both the two opposite sides are perpendicular to the top surface of the ceramic body 1. Further, the two termination electrodes 2A, 2B electrically connect the internal electrodes 1101A, 1101B of the multiple ceramic-electrode layers 110A, 110B, respectively.

Figure 2:
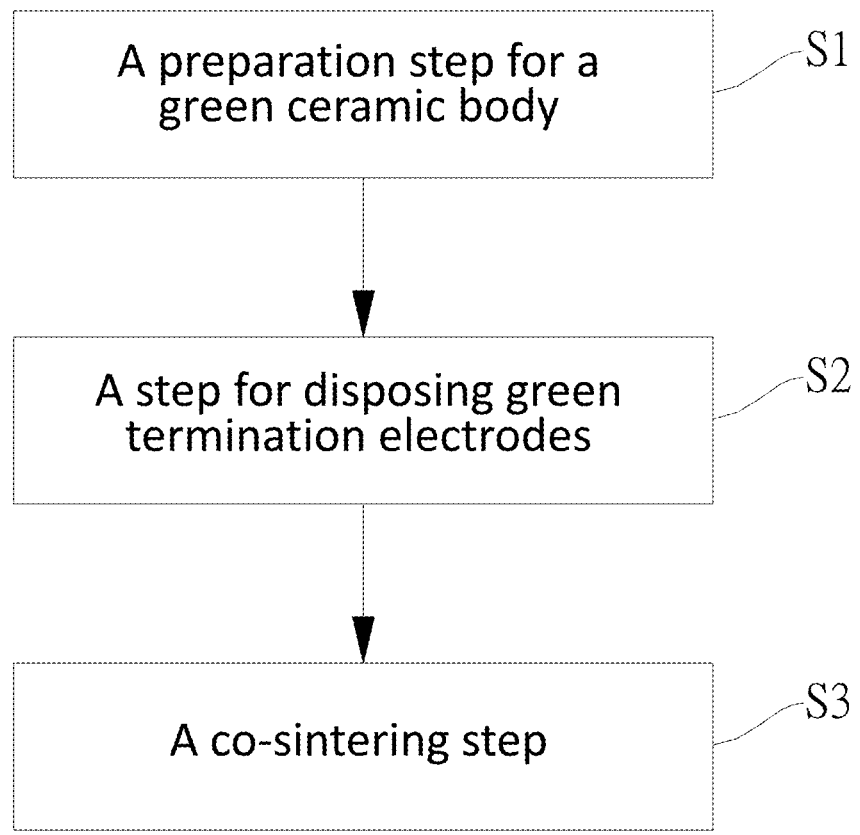
FIG. 2 is a flow chart of the manufacturing method for the multilayer ceramic electronic component of the present invention.

2. The Manufacturing Method for a Multilayer Ceramic Electronic Component (1) As shown in FIG. 2, the manufacturing method for the multilayer ceramic electronic component of the present invention firstly carries out the step S1: a preparation step for a green ceramic body: shaping a ceramic slurry into multiple green ceramic thin layers, and the multiple green ceramic thin layers can respectively serve as a top green ceramic layer and multiple middle green ceramic layers; disposing a green internal electrode on top of each of the middle green ceramic layers respectively to obtain multiple green ceramic-electrode layers; stacking the multiple green ceramic-electrode layers to obtain a green stacked structure with ceramic-electrode alternating layers; disposing the top green ceramic layer on top of the green stacked structure with ceramic-electrode alternating layers to obtain the green ceramic body.

Specifically, a ceramic body composite, a dispersant and an organic solvent were mixed and ground for dispersing thereof, and a binder and a plasticizer were further added to form a ceramic slurry after stirring. Based on the total amount of the ceramic body composite, the ceramic body composite comprised $BaTiO_3$ in an amount of 99 weight percent and the sintering agent of $BaO \geq CaO—MoO_3—MgO—Al_2O_3—SiO_2$ in an amount of 1 weight percent. The dispersant adopted an anionic surfactant, the organic solvent adopted a mixture of toluene and alcohol with the volume ratio of 1:1, the binder adopted polyvinyl butyral resin, and the plasticizer adopted phthalate esters. Further, the ceramic material has a median particle size (D50) of 250 nm. Finally, the amounts of the dispersant, the organic solvent, the binder and the plasticizer can be adjusted according to demand.

By means of foil casting, the ceramic slurry was cast into multiple green ceramic thin layers, each of which had a thickness of 2 μm; wherein part of the green ceramic thin layers were reserved to serve as the top green ceramic layer and the bottom green ceramic layer, and the rest of the green ceramic thin layers served as the middle green ceramic layer. By means of screen printing, a green internal electrode (nickel electrode) was printed on the top surface of each middle green ceramic layer in continuous patterns to obtain multiple green ceramic-electrode layers. The multiple green ceramic-electrode layers were stacked on each other to obtain a green stacked structure with ceramic-electrode alternating layers. Finally, the green stacked structure with ceramic-electrode alternating layers was disposed on top of the bottom green ceramic layer, and the top green ceramic layer was disposed on top of the green stacked structure with ceramic-electrode alternating layers to obtain the green ceramic body. By means of lamination to make the layers within the green ceramic body bind to each other tightly, the green ceramic body was further cut into pieces with a demanding size, and the appearance thereof was further refined by tumbling.

2. The step S2 is carried out as follows: a step for disposing green termination electrodes: disposing a termination electrode composite on opposite sides of the green ceramic body respectively to form the green termination electrodes, thereby obtaining a green body.

Specifically, based on the total amount of the termination electrode composite, the ceramic material of $BaTi_4O_9$ in an amount of 7.5 weight percent, the metal material of nickel in an amount of 67.5 weight percent, the resin of poly(methyl methacrylate) in an amount of 7 weight percent, and the organic solvent of terpineol in an amount of 18 weight percent were stirred and dispersed evenly in a triple roll mill to obtain a termination electrode paste. The termination electrode paste was provided on opposite sides of the green ceramic body by dipping to obtain a green body. That is, the two termination electrodes are respectively disposed on opposite sides of the ceramic body, and both the two opposite sides are perpendicular to the top surface of the ceramic body. Further, the metal material had a median particle size (D50) of 3 μm.

3. The step S3 is carried out as follows: a co-sintering step: heating the green body to obtain the multilayer ceramic electronic component.

Specifically, a burning out step was carried out first: the green body was heated at 350° C. for 12 hours to burn out the organic matters in the green body to obtain a primary body. Then, a sintering step was carried out: the primary body was heated at 1350° C. for 2 hours to obtain the multilayer ceramic electronic component. Finally, by means of plating, both a nickel layer and a tin layer were added on each of the termination electrodes of the multilayer ceramic electronic component sequentially to obtain a finished product, which is a capacitor with two three-layer external electrodes. The three-layer external electrode sequentially comprised the termination electrode, nickel layer and a tin layer from the inside of the multilayer ceramic electronic component. Further, the ceramic body of the multilayer ceramic electronic component comprised multiple crystals, and the multiple crystals had a size of about 0.01 inches*0.005 inches.

II. Results Analysis

The analysis items of Example 1-1 comprise: (1) the densification of the termination electrodes, (2) the condition of glass aggregation on the surface of the termination electrodes, (3) blisters in the termination electrodes, (4) the cracking conditions of the ceramic body resulting from the overcontraction of the termination electrodes, (5) the connection condition of the internal electrodes and the termination electrodes, (6) the interface separation condition between the termination electrodes and the ceramic body, (7) the continuity degree of the three-layer external electrodes, (8) the weldability degree of the three-layer external electrodes, (9) the tensile strength of the capacitor, and (10) the coefficient of variation (COV) of the capacitance value, and the analysis method thereof were elaborated as follows:

1. The Densification of the Termination Electrodes

Before the multilayer ceramic electronic component was further added with a nickel layer and a tin layer by plating to obtain a finished product, the densification of the termination electrodes was observed according to the steps as follows:

(1) The grinding and polishing steps: The side, which was not provided with the termination electrode, of the multilayer ceramic electronic component was ground by a sandpaper (brand: 3M, specification: #1200) to obtain a ground sample, wherein the ground sample was about half the volume of the multilayer ceramic electronic component. The ground sample was then polished by a flannel with an aluminum oxide powder of 0.5 μm to obtain a polished sample. Therefore, the polished sample had a polished side.

(2) Infiltration treatment with a fluorescent liquid: The polished sample was soaked in a fluorescent liquid, and then was moved to a negative pressure environment (vacuumization) for 30 minutes, so that the fluorescent liquid infiltrated the termination electrodes to obtain a sample infiltrated by the fluorescent liquid. The sample infiltrated by the fluorescent liquid was then dried to obtain a dried sample. The side, which corresponded to the polished side, of the dried sample was ground by a sandpaper (brand: 3M, specification: #1200) and then polished by a flannel with an aluminum oxide powder of 0.5 μm to obtain a fluorescent sample. Therefore, the fluorescent sample had a fluorescent polished side.

(3) Fluorescence microscopy analysis: The fluorescent sample was observed by a fluorescence microscope, and the fluorescent infiltration area of the fluorescent polished side was analyzed by a software of Image pro-10 to obtain the fluorescent infiltration rate, which was further classified into three levels: (A) Good densification, represented as "O", indicated that the fluorescent infiltration rate was less than 5%; (B) Acceptable densification, represented as "Δ", indicated that the fluorescent infiltration rate was more than or equal to 5% to 10%; and (C) Poor densification, represented as "X", indicated that the fluorescent infiltration rate was more than 10%. The result was shown in Table 1-1.

2. The Condition of Glass Aggregation on the Surface of the Termination Electrodes Before the multilayer ceramic electronic component was further added with a nickel layer and a tin layer by plating to obtain a finished product, the outer surface of the termination electrodes was observed by a scanning electron microscope to determine whether there was glass aggregation on the surface of the termination electrodes or not. The result was classified into two categories: (A) No, represented as "N", indicated that the thickness of glass aggregation on the surface of the termination electrodes was less than or equal to 10 μm, which was a qualified result; (B) Yes, represented as "Y", indicated that the thickness of glass aggregation on the surface of the termination electrodes was more than 10 μm, which was a failed result, and was shown in Table 1-1.

3. The Condition of Blisters in the Termination Electrodes

Before the multilayer ceramic electronic component was further added with a nickel layer and a tin layer by plating to obtain a finished product, the outer surface and the internal part of the termination electrodes were observed to determine whether there were blisters in the termination electrodes or not.

The steps comprised: (1) the grinding and polishing steps recited in the "1. The densification of the termination electrodes"; and (2) the analysis step: the outer surface and the polished side of the polished sample were observed by a microscope. The result was classified into two categories: (A) No, represented as "N", indicated that no bubble was identified, which was a qualified result; (B) Yes, represented as "Y", indicated that a bubble was identified, which was a failed result, and was shown in Table 1-1.

Figure 3:
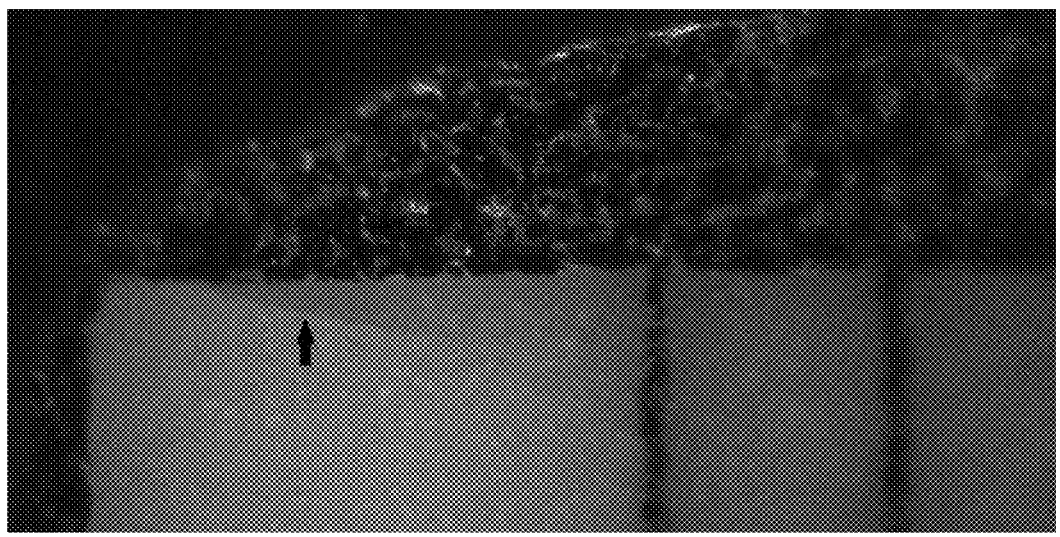
FIG. 3 is the photo showing cracking of the ceramic body resulting from the overcontraction of the termination electrodes.

4. The Cracking Conditions of the Ceramic Body Resulting from the Overcontraction of the Termination Electrodes Before the multilayer ceramic electronic component was further added with a nickel layer and a tin layer by plating to obtain a finished product, the multilayer ceramic electronic component was observed to determine whether there was any cracking of the ceramic body resulting from the overcontraction of the termination electrodes The steps comprised: (1) the grinding and polishing steps recited in the "1. The densification of the termination electrodes"; and (2) the analysis step: the outer surface and the polished side of the polished sample were observed by a microscope. The result was classified into two categories: (A) No, represented as "N", indicated that no overcontraction of the termination electrodes was identified, which was a qualified result; (B) Yes, represented as "Y", indicated that overcontraction of the termination electrodes was identified, which was a failed result, and was shown in Table 1-1. Further, the photo of a cracking of the ceramic body resulting from the overcontraction of the termination electrodes was shown in FIG. 3; wherein the cracking site was pointed out by arrows.

5. The Connection Condition of the Internal Electrodes and the Termination Electrodes Before the multilayer ceramic electronic component was further added with a nickel layer and a tin layer by plating to obtain a finished product, the connection condition of the internal electrodes and the termination electrodes was observed and analyzed by a software of Image pro-10.

Figure 4:
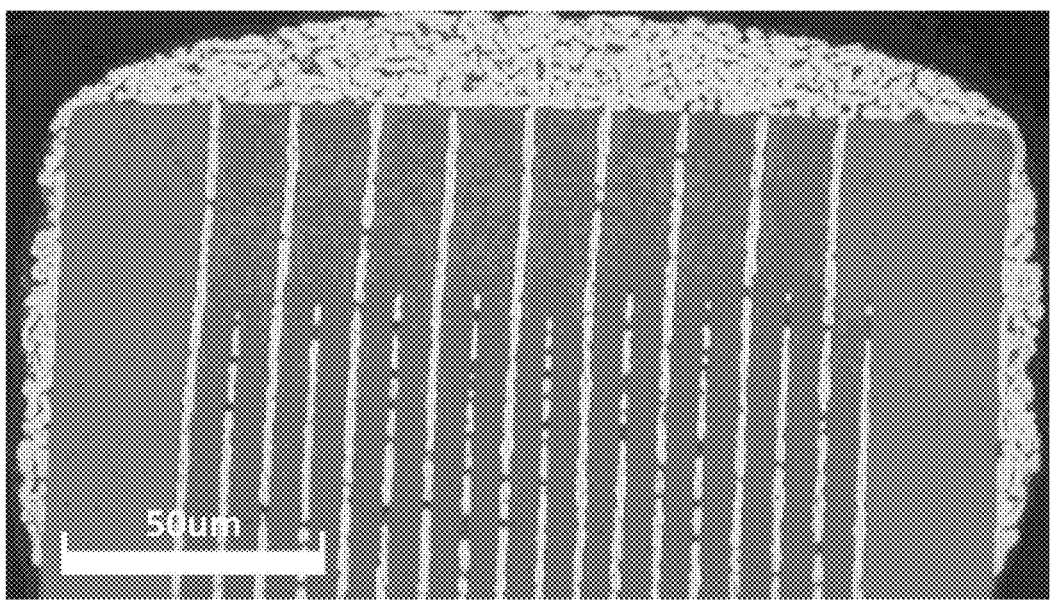
FIG. 4 is the photo showing that the internal electrodes and the termination electrodes have good connections without an interface separation between the termination electrodes and the ceramic body.

The steps comprised: (1) the grinding and polishing steps recited in the "1. The densification of the termination electrodes"; and (2) the analysis step: the polished side of the polished sample was observed by a microscope. The result was classified into three levels: (A) Good connection, represented as "O", indicated that the connection rate between the internal electrodes and the termination electrodes was more than or equal to 70% to 100%; (B) Acceptable connection, represented as "Δ", indicated that the connection rate between the internal electrodes and the termination electrodes was more than or equal to 35% to less than 70%; and (C) Poor connection, represented as "X", indicated that the connection rate between the internal electrodes and the termination electrodes was 0% to less than 35%, and was shown in Table 1-2. Further, FIG. 4 the photo shows the connection between the internal electrodes and the termination electrodes was classified as good connection.

6. The Interface Separation Condition Between the Termination Electrodes and the Ceramic Body Before the multilayer ceramic electronic component was further added with a nickel layer and a tin layer by plating to obtain a finished product, the multilayer ceramic electronic component was observed to determine whether there was any interface separation condition between the termination electrodes and the ceramic body.

Figure 5:
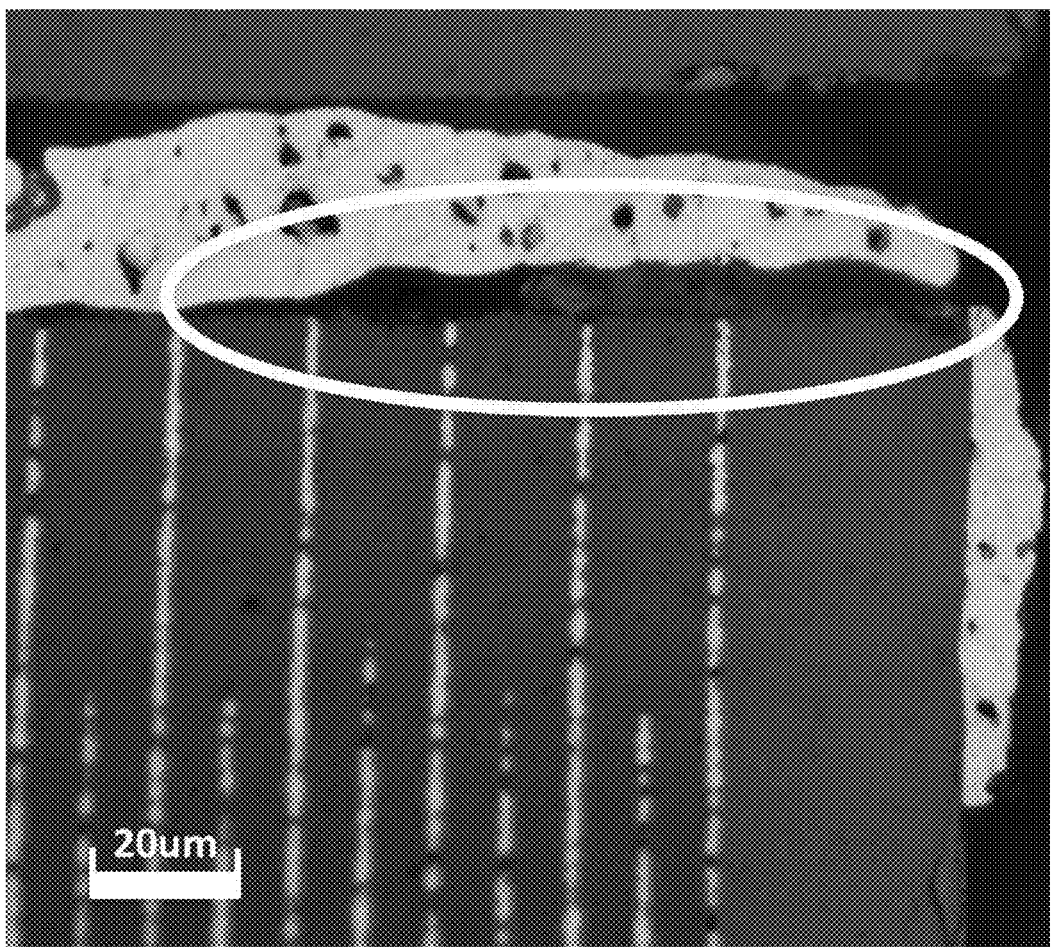
FIG. 5 is the photo showing the defect of the interface separation between the termination electrodes and the ceramic body.

The steps comprised: (1) the grinding and polishing steps recited in the "1. The densification of the termination electrodes"; and (2) the analysis step: the polished side of the polished sample was observed by a microscope. The result was classified into two categories: (A) No, represented as "N", indicated that no interface separation was identified, which was a qualified result; (B) Yes, represented as "Y", indicated that the defect of the interface separation was identified, which was a failed result, and was shown in Table 1-2. Further, FIG. 4 the photo shows no interface separation between the termination electrodes and the ceramic body;

and FIG. 5 the photo shows the defect of the interface separation between the termination electrodes and the ceramic body.

7. The Continuity Degree of the Three-Layer External Electrodes

After the multilayer ceramic electronic component was further added with a nickel layer and a tin layer by plating to obtain a finished product, the continuity degree of the three-layer external electrodes was observed.

The steps comprised as follows:
(1) The grinding and polishing steps: The side, which was not provided with the three-layer external electrodes, of the finished product was ground by a sandpaper (brand: 3M, specification: #1200) to obtain a ground test sample, wherein the ground test sample was about half the volume of the finished product. The ground test sample was then polished by a flannel with an aluminum oxide powder of 0.5 μm to obtain a polished test sample. Therefore, the test polished sample had a polished lateral surface.
(2) The analysis step: The nickel layer in the polished lateral surface of the polished test sample was observed by a microscope. The result was classified into three levels: (A) Good continuity, represented as "O", indicated that the nickel layer was in a continuous state, or that no break of the nickel layer was identified; (B) Acceptable continuity, represented as "Δ", indicated that a break of the nickel layer was identified, and the break had a length of less than or equal to 25 μm; and (C) Poor continuity, represented as "X", indicated that a break of the nickel layer was identified, and the break had a length of more than 25 μm, and was shown in Table 1-2.

8. The Weldability Degree of the Three-Layer External Electrodes

After the multilayer ceramic electronic component was further added with a nickel layer and a tin layer by plating to obtain a finished product, the weldability degree of the three-layer external electrodes was observed.

Figure 6:
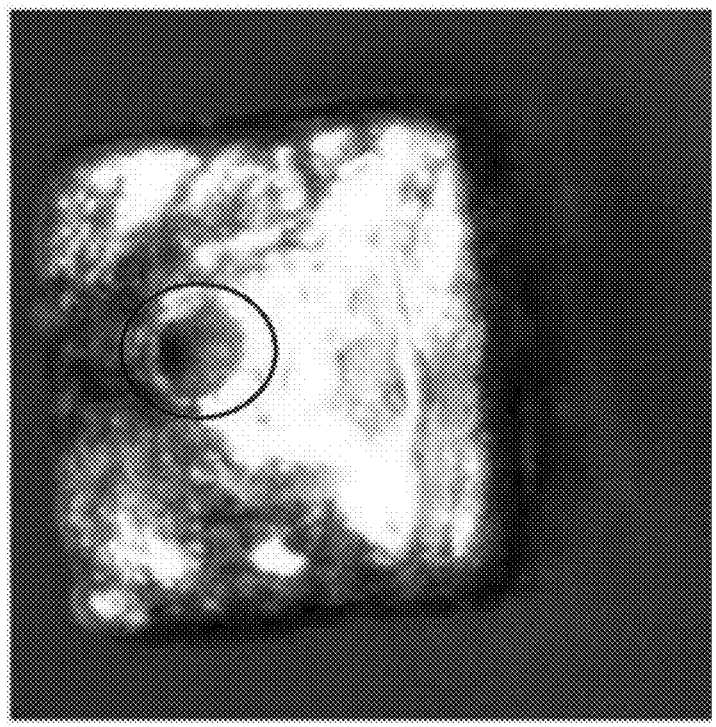
FIG. 6 is the photo showing the partial surface of the termination electrode exposed after the three-layer external electrode was soaked in a tin liquid.

The steps comprised as follows:
The finished product was soaked in a tin liquid at 260° C. for 30 seconds, and the partial surface of the termination electrode exposed was observed by a microscope for calculating the ratio of the exposed partial surface of the termination electrode to the full surface of the nickel layer of the three-layer external electrodes in the microscope field of view. That is, if the nickel layer of the three-layer external electrodes did not fully cover the termination electrode, which reflected the weldability degree, the tin layer may contact part surface of the termination electrode directly, and said part surface of the termination electrode would be exposed as well after the tin liquid removed the tin layer of the three-layer external electrodes to show the full surface of the nickel layer of the three-layer external electrodes. Further, said full surface of the nickel layer is calculated by the outline of the nickel layer. The result was classified into three levels: (A) Good weldability, represented as "O", indicated that the proportion of the exposed partial surface of the termination electrode was less than or equal to 5%; (B) Acceptable weldability, represented as "Δ", indicated that the proportion of the exposed partial surface of the termination electrode was more than 5% to 10%; and (C) Poor weldability, represented as "X", indicated that the proportion of the exposed partial surface of the termination electrode was more than 10%, as shown in Table 1-2. Further, the exposed partial surface of the termination electrode was shown in FIG. 6; wherein the exposed site was marked by a circle.

9. The Tensile Strength of the Capacitor

After the multilayer ceramic electronic component was further added with a nickel layer and a tin layer by plating to obtain a finished product (a capacitor with two three-layer external electrodes), two iron wires were each welded to each of the outer surfaces of the two three-layer external electrodes of the capacitor one by one with a lead-free solder paste of tin. Then, the two iron wires were clamped by a universal tensile testing machine and were pulled in the opposite up-and-down directions to measure the tensile strength of the finished product. The result was shown in Table 1-2, and was further classified into two levels: (A) a qualified result indicated that the tensile strength of the finished product was greater than 1.5 kgf, and (B) a failed result indicated that the tensile strength of the finished product was less than or equal to 1.5 kgf.

10. The Coefficient of Variation (COV) of the Capacitance Value

After the multilayer ceramic electronic component was further added with a nickel layer and a tin layer by plating to obtain a finished product, the capacitance values of 30 finished products were measured under a frequency of alternating current (AC) of 1 MHz and an AC voltage of 1 Vrms by a capacitance meter (model: Keysight 4278A), and the COV of the capacitance value was calculated by the formula: the COV of the capacitance value=(the standard deviation of the capacitance values/the mean value of the capacitance values)*100%. The results were shown in Table 1-2 and further classified into three levels: (A) Good production yield rate of capacitors: a COV of the capacitance values less than or equal to 3%; (B) Acceptable production yield rate of capacitors: a COV of the capacitance values more than 3% to less than or equal to 5%; and (C) Poor production yield rate of capacitors: a COV of the capacitance values more than 5%, which was a failed result.

TABLE 1-1 the densification of the termination electrodes ("densification"),
the condition of glass aggregation on the surface ("glass aggregation"),
the condition of blisters ("blisters"), the cracking conditions
of the ceramic body resulting from the overcontraction of the termination
electrodes ("overcontraction") of Example 1-1 ("E1-1")

| | Densification | Glass aggregation | Blisters | Overcontraction |
|---|---|---|---|---|
| E1-1 | O | N | N | N |

According to Table 1-1, even E1-1 did not adopt a glass material as a sintering agent for enhancing the densification of the termination electrodes during sintering, the termination electrodes of E1-1 still had good densification. Further, none of the structural defects of the glass aggregation on the surface, blisters and overcontraction of the termination electrodes was identified.

TABLE 1-2 the connection condition of the internal electrodes and the termination electrodes ("connection"), the interface separation condition between the termination electrodes and the ceramic body ("interface separation"), the continuity degree of the three-layer external electrodes ("continuity"), the weldability degree of the three-layer external electrodes ("weldability"), the tensile strength of the capacitor ("tensile strength"), and the coefficient of variation of the capacitance value ("COV") of E1-1

| | Connection | Interface separation | Continuity | Weldability | Tensile strength (kgf) | COV (%) |
|---|---|---|---|---|---|---|
| E1-1 | ○ | N | ○ | ○ | 2.16 | 1.3 |

According to Table 1-2, the connection condition of the internal electrodes and the termination electrodes of E1-1 was good, and no defect of the interface separation between the termination electrodes and the ceramic body was identified. Further, both the continuity degree of the three-layer external electrodes and the weldability degree of E1-1 were good. Finally, the tensile strength of the capacitor of E1-1 was as high as 2.16 kgf. Therefore, the capacitor obtained by the adoption of the co-sintering step of the present invention can have the advantages of a tight connection between the termination electrodes and the ceramic body, and low COV of the capacitance value.

III. Comparative Example 1-1 to Comparative Example 1-21 and Example 1-1 to Example 1-14

The main purpose of this experiment was to understand the feasible ranges of the amounts of both the ceramic material and the metal material for the termination electrode composite. This experiment comprised five groups: Comparative examples 1-1 to 1-7 (CE1-1 to CE 1-7), Comparative examples 1-8 to 1-14 (CE1-8 to CE1-14), Examples 1-1 to 1-7 (E1-1 to E1-7), Examples 1-8 to 1-14 (E1-8 to E1-14), and Comparative examples 1-15 to 1-21 (CE1-15 to CE1-21), and was elaborated as follows:

1. CE1-1 to CE 1-7: For the termination electrode composite, the differences between CE1-1 to CE 1-7 and E1-1 were that none of CE1-1 to CE 1-7 adopted the ceramic material, and all of CE1-1 to CE 1-7 adopted the metal material in an amount of 75 weight percent.
2. CE1-8 to CE1-14: For the termination electrode composite, the differences between CE1-8 to CE1-14 and E1-1 were that all of CE1-8 to CE1-14 adopted the ceramic material in an amount of 3.75 weight percent and the metal material in an amount of 71.25 weight percent.
3. E1-1 to E1-7: All of E1-1 to E1-7 comprised the same termination electrode composite, wherein the ceramic material was in an amount of 7.5 weight percent, and the metal material was in an amount of 67.5 weight percent.
4. E1-8 to E1-14: For the termination electrode composite, the differences between E1-8 to E1-14 and E1-1 were that all of E1-8 to E1-14 adopted the ceramic material in an amount of 11.25 weight percent and the metal material in an amount of 63.75 weight percent.
5. CE1-15 to CE1-21: For the termination electrode composite, the differences between CE1-15 to CE1-21 and E1-1 were that all of CE1-15 to CE1-21 adopted the ceramic material in an amount of 15 weight percent and the metal material in an amount of 60 weight percent.

Further, the type of the metal material of the termination electrode composite, the type of the metal ingredient of the internal electrodes, the ceramic body composite and the sintering temperature in the same group were further adjusted to observe whether such parameters will affect the analysis results of the capacitor. Therefore, the manufacturing methods of CE1-1 to CE1-14, E1-2 to E1-14 and CE1-15 to CE1-21 were similar to that of E1-1; wherein the differences were (1) the amount of the ceramic material of the termination electrode composite, (2) the type and the amount of the metal material of the termination electrode composite, (3) the metal ingredient of the internal electrodes, (4) the ceramic body composite, and (5) the sintering temperature, as shown in Table 2-1. The analysis results of all groups were shown in Table 2-2 and Table 2-3. Finally, the content of Table 2-1 was further elaborated as follows:

(1) For the type of the metal material of the termination electrode composite ("type of metal material"): If the type of the metal material was an alloy, based on the total amount of the alloy, the weight percentage of each metal thereof was presented as the value in parentheses.

(2) For the type of the metal ingredient of the internal electrodes ("metal ingredient"): If the type of the metal ingredient was an alloy, based on the total amount of the alloy, the weight percentage of each metal thereof was presented as the value in parentheses.

(3) For the type of the ceramic body composite ("type of ceramic body"):

A. "I" indicated that the ceramic body composite comprised 99 weight percent of the ceramic ingredient of $BaTiO_3$ and 1 weight percent of the sintering agent of $BaO$—$CaO$—$MoO_3$—$MgO$—$Al_2O_3$—$SiO_2$.

B. "II" indicated that the ceramic body composite comprised 99 weight percent of the ceramic ingredient of $(SrCa)(ZrTi)O_3$ and 1 weight percent of the sintering agent of $CaO$—$MnO$—$B_2O_3$—$SiO_2$.

C. "III" indicated that the ceramic body composite comprised 97 weight percent of the ceramic ingredient of $BaTiO_3$ and 3 weight percent of the sintering agent of $BaO$—$CaO$—$MoO_3$—$MgO$—$Al_2O_3$—$SiO_2$.

D. "IV" indicated that the ceramic body composite comprised 90 weight percent of the ceramic ingredient of $BaTi_4O$, and 10 weight percent of the sintering agent of $BaO$—$ZnO$—$B_2O_3$—$SiO_2$.

E. "V" indicated that the ceramic body composite comprised 90 weight percent of the ceramic ingredient of $CaZrO_3$ and 10 weight percent of the sintering agent of $CaO$—$MnO$—$B_2O_3$—$SiO_2$.

TABLE 2-1 the amount of the ceramic material of the termination electrode composite ("amount of ceramic material"), the amount of the metal material of the termination electrode composite ("amount of metal material"), the type of the metal material of the termination electrode composite ("type of metal material"), the type of the metal ingredient of the internal electrodes ("metal ingredient"), the type of the ceramic body composite ("type of ceramic body"), and the sintering temperature of the co-sintering step ("sintering temperature") sintering temperature of CE1-1 to CE1-21 and E1-1 to E1-14

| | Amount of ceramic material (weight percent) | Metal material Amount (weight percent) | Type | Metal ingredient | Type of ceramic body | Sintering temperature (° C.) |
|---|---|---|---|---|---|---|
| CE1-1 | 0 | 75 | Ni | Ni | I | 1350 |
| CE1-2 | 0 | 75 | Cu (15) | Ni | II | 1300 |

TABLE 2-1-continued the amount of the ceramic material of the termination electrode composite ("amount of ceramic material"), the amount of the metal material of the termination electrode composite ("amount of metal material"), the type of the metal material of the termination electrode composite ("type of metal material"), the type of the metal ingredient of the internal electrodes ("metal ingredient"), the type of the ceramic body composite ("type of ceramic body"), and the sintering temperature of the co-sintering step ("sintering temperature") sintering temperature of CE1-1 to CE1-21 and E1-1 to E1-14

| | Amount of ceramic material (weight percent) | Metal material Amount (weight percent) | Type | Metal ingredient | Type of ceramic body | Sintering temperature (° C.) |
|---|---|---|---|---|---|---|
| CE1-3 | 0 | 75 | Ni (85) Cu (30) | Ni | I | 1250 |
| CE1-4 | 0 | 75 | Ni (70) Cu (45) | Ni | III | 1150 |
| CE1-5 | 0 | 75 | Ni (55) Cu (70) | Ni (55) | IV | 1000 |
| CE1-6 | 0 | 75 | Ni (30) Cu (45) Cu (85) | Cu | IV | 975 |
| CE1-7 | 0 | 75 | Ni (15) Cu | Cu | IV | 950 |
| CE1-8 | 3.75 | 71.25 | Ni | Ni | I | 1350 |
| CE1-9 | 3.75 | 71.25 | Cu (15) Ni (85) | Ni | II | 1300 |
| CE1-10 | 3.75 | 71.25 | Cu (30) Ni (70) | Ni | I | 1250 |
| CE1-11 | 3.75 | 71.25 | Cu (45) Ni (55) | Ni | III | 1150 |
| CE1-12 | 3.75 | 71.25 | Cu (70) Ni (30) Cu (45) | Ni (55) | V | 1000 |
| CE1-13 | 3.75 | 71.25 | Cu (85) Ni (15) | Cu | V | 975 |
| CE1-14 | 3.75 | 71.25 | Cu | Cu | V | 950 |
| E1-1 | 7.5 | 67.5 | Ni | Ni | I | 1350 |
| E1-2 | 7.5 | 67.5 | Cu (15) Ni (85) | Ni | II | 1300 |
| E1-3 | 7.5 | 67.5 | Cu (30) Ni (70) | Ni | I | 1250 |
| E1-4 | 7.5 | 67.5 | Cu (45) Ni (55) | Ni | III | 1150 |
| E1-5 | 7.5 | 67.5 | Cu (70) Ni (30) Cu (45) | Ni (55) | IV | 1000 |
| E1-6 | 7.5 | 67.5 | Cu (85) Ni (15) | Cu | IV | 975 |
| E1-7 | 7.5 | 67.5 | Cu | Cu | IV | 950 |
| E1-8 | 11.25 | 63.75 | Ni | Ni | I | 1350 |
| E1-9 | 11.25 | 63.75 | Cu (15) Ni (85) | Ni | II | 1300 |
| E1-10 | 11.25 | 63.75 | Cu (30) Ni (70) | Ni | I | 1250 |
| E1-11 | 11.25 | 63.75 | Cu (45) Ni (55) | Ni | III | 1150 |
| E1-12 | 11.25 | 63.75 | Cu (70) Ni (30) Cu (45) | Ni (55) | IV | 1000 |
| E1-13 | 11.25 | 63.75 | Cu (85) Ni (15) | Cu | IV | 975 |
| E1-14 | 11.25 | 63.75 | Cu | Cu | IV | 950 |
| CE1-15 | 15 | 60 | Ni | Ni | I | 1350 |
| CE1-16 | 15 | 60 | Cu (15) Ni (85) | Ni | II | 1300 |
| CE1-17 | 15 | 60 | Cu (30) Ni (70) | Ni | I | 1250 |
| CE1-18 | 15 | 60 | Cu (45) Ni (55) | Ni | III | 1150 |
| CE1-19 | 15 | 60 | Cu (70) Ni (30) Cu (45) | Ni (55) | IV | 1000 |
| CE1-20 | 15 | 60 | Cu (85) Ni (15) | Cu | IV | 975 |
| CE1-21 | 15 | 60 | Cu | Cu | IV | 950 |

TABLE 2-2 the densification of the termination electrodes ("densification"), the condition of glass aggregation on the surface ("glass aggregation"), the condition of blisters ("blisters"), the cracking conditions of the ceramic body resulting from the overcontraction of the termination electrodes ("overcontraction") of CE1-1 to CE1-21 and E1-1 to E1-14

| | Densification | Glass aggregation | Blisters | Overcontraction |
|---|---|---|---|---|
| CE1-1 | ○ | N | N | Y |
| CE1-2 | ○ | N | N | Y |
| CE1-3 | ○ | N | N | Y |
| CE1-4 | ○ | N | N | Y |
| CE1-5 | ○ | N | N | Y |
| CE1-6 | ○ | N | N | Y |
| CE1-7 | ○ | N | N | Y |
| CE1-8 | ○ | N | N | Y |
| CE1-9 | ○ | N | N | Y |
| CE1-10 | ○ | N | N | Y |
| CE1-11 | ○ | N | N | Y |
| CE1-12 | ○ | N | N | Y |
| CE1-13 | ○ | N | N | Y |
| CE1-14 | ○ | N | N | Y |
| E1-1 | ○ | N | N | N |
| E1-2 | ○ | N | N | N |
| E1-3 | ○ | N | N | N |
| E1-4 | ○ | N | N | N |
| E1-5 | ○ | N | N | N |
| E1-6 | ○ | N | N | N |
| E1-7 | ○ | N | N | N |
| E1-8 | ○ | N | N | N |
| E1-9 | ○ | N | N | N |
| E1-10 | ○ | N | N | N |
| E1-11 | ○ | N | N | N |
| E1-12 | ○ | N | N | N |
| E1-13 | ○ | N | N | N |
| E1-14 | ○ | N | N | N |
| CE1-15 | ○ | N | N | N |
| CE1-16 | ○ | N | N | N |
| CE1-17 | ○ | N | N | N |
| CE1-18 | ○ | N | N | N |
| CE1-19 | ○ | N | N | N |
| CE1-20 | ○ | N | N | N |
| CE1-21 | ○ | N | N | N |

According to Table 2-1 and Table 2-2, even all groups did not adopt a glass material as a sintering agent for the termination electrode composite, especially that CE1-1 to CE1-7 even did not adopt any ceramic material, the termination electrodes of all groups still had good densification. Therefore, one may find that the sintering agent in the green ceramic body can flow to the green termination electrodes by capillarity action to facilitate the liquid phase sintering reaction or the formation of a low-temperature eutectic phase in the green termination electrodes during sintering, so that the termination electrodes can undergo a consolidation process.

Further, none of the structural defects of the glass aggregation on the surface, blisters and overcontraction of the termination electrodes was identified. That is, even the sintering agent of the green ceramic body flowed to the green termination electrodes during sintering, none of the structural defects of the glass aggregation on the surface and blisters was identified. Therefore, one may find that the termination electrode composite indeed did not require a sintering agent.

Finally, only CE1-1 to CE1-14 had the cracking issues in the ceramic body resulting from the overcontraction of the termination electrodes, and none of the rest of the groups had the structural defects of the overcontraction of the termination electrodes. Therefore, one may find that insufficient amount of the ceramic material, which was 0 weight percent or 3.75 weight percent, resulted in the structural defect of the overcontraction of the termination electrodes, as E1-1 to E1-14 and CE1-15 to CE1-21, which all had higher amount of the ceramic material, did not have such structural defect.

TABLE 2-3 the connection condition of the internal electrodes and the termination electrodes ("connection"), the interface separation condition between the termination electrodes and the ceramic body ("interface separation"), the continuity degree of the three-layer external electrodes ("continuity"), the weldability degree of the three-layer external electrodes ("weldability"), the tensile strength of the capacitor ("tensile strength") and the coefficient of variation of the capacitance value ("COV") of CE1-1 to CE1-21 and E1-1 to E1-14

| | Connection | Interface separation | Continuity | Weld-ability | Tensile strength (kgf) | COV (%) |
|---|---|---|---|---|---|---|
| CE1-1 | X | Y | N/A | N/A | N/A | 16.3 |
| CE1-2 | X | Y | N/A | N/A | N/A | 16.1 |
| CE1-3 | X | Y | N/A | N/A | N/A | 15.8 |
| CE1-4 | X | Y | N/A | N/A | N/A | 16.5 |
| CE1-5 | X | Y | N/A | N/A | N/A | 16.5 |
| CE1-6 | X | Y | N/A | N/A | N/A | 16.0 |
| CE1-7 | X | Y | N/A | N/A | N/A | 17.5 |
| CE1-8 | ○ | N | ○ | ○ | 1.15 | 1.5 |
| CE1-9 | ○ | N | ○ | ○ | 1.16 | 1.6 |
| CE1-10 | ○ | N | ○ | ○ | 1.14 | 1.6 |
| CE1-11 | ○ | N | ○ | ○ | 1.13 | 1.6 |
| CE1-12 | ○ | N | ○ | ○ | 1.16 | 1.4 |
| CE1-13 | ○ | N | ○ | ○ | 1.14 | 1.6 |
| CE1-14 | ○ | N | ○ | ○ | 1.15 | 1.5 |
| E1-1 | ○ | N | ○ | ○ | 2.16 | 1.3 |
| E1-2 | ○ | N | ○ | ○ | 2.14 | 1.4 |
| E1-3 | ○ | N | ○ | ○ | 2.16 | 1.5 |
| E1-4 | ○ | N | ○ | ○ | 2.13 | 1.3 |
| E1-5 | ○ | N | ○ | ○ | 2.17 | 1.3 |
| E1-6 | ○ | N | ○ | ○ | 2.19 | 1.4 |
| E1-7 | ○ | N | ○ | ○ | 2.19 | 1.5 |
| E1-8 | Δ | N | Δ | Δ | 2.34 | 2.1 |
| E1-9 | Δ | N | Δ | Δ | 2.32 | 2.3 |
| E1-10 | Δ | N | Δ | Δ | 2.36 | 2.1 |
| E1-11 | Δ | N | Δ | Δ | 2.33 | 2.1 |
| E1-12 | Δ | N | Δ | Δ | 2.38 | 2.3 |
| E1-13 | Δ | N | Δ | Δ | 2.33 | 2.3 |
| E1-14 | Δ | N | Δ | Δ | 2.36 | 2.4 |
| CE1-15 | X | N | X | X | 2.65 | 6.8 |
| CE1-16 | X | N | X | X | 2.66 | 6.5 |
| CE1-17 | X | N | X | X | 2.64 | 6.4 |
| CE1-18 | X | N | X | X | 2.69 | 6.2 |
| CE1-19 | X | N | X | X | 2.65 | 6.3 |
| CE1-20 | X | N | X | X | 2.63 | 6.3 |
| CE1-21 | X | N | X | X | 2.60 | 6.3 |

According to Table 2-3, CE1-1 to CE1-7 did not adopt any ceramic material, resulting in that the termination electrodes cannot attach to the ceramic body, so that (1) the defect of the interface separation was identified; and (2) the internal electrodes and the termination electrodes cannot contact each other during sintering, and the failed results of the connection thereof were identified. Therefore, there was no need to measure the continuity degree of the three-layer external electrodes, the weldability degree of the three-layer external electrodes and the tensile strength of the capacitor.

Meanwhile, for CE1-1 to CE1-7, as the connections between the termination electrodes and the internal electrodes or the ceramic body were poor, the COVs of the capacitance value were significantly high (15.8% to 17.5%), and were classified as a failed result.

For CE1-8 to CE1-14, as CE1-8 to CE1-14 all adopted the ceramic material (3.75 weight percent), the connection condition of the internal electrodes and the termination electrodes, the continuity degree of the three-layer external electrodes and the weldability degree of the three-layer external electrodes were all classified as a good result. Nonetheless, as CE1-8 to CE1-14 had the cracking defect in the ceramic body resulting from the overcontraction of the termination electrodes, the tensile strength of the capacitor was about 1.13 kgf to 1.16 kgf, which were about half of those of E1-1 to E1-14.

For CE1-15 to CE1-21, although CE1-15 to CE1-21 all adopted the ceramic material (15 weight percent), CE1-15 to 1-21 all had poor connection between the internal electrodes and the termination electrodes, resulting in the significant increase of the COV of the capacitance value and classified as a failed result. Further, while CE1-15 to CE1-21 had high amount of the ceramic material (15 weight percent), which increased the attachment capacity of the termination electrodes to the ceramic body and increased the tensile strengths, which were all more than 2.6 kgf, CE1-15 to CE1-21 had other defects of poor continuity degree of the three-layer external electrodes, and poor weldability degree of the three-layer external electrodes. Therefore, excessive amount of the ceramic material, which was 15 weight percent, resulted in the problem that the distribution of the ceramic material between the termination electrodes and the internal electrodes caused the poor connection thereof, and lowered the attachment capacity of the rest of the two layers of the three-layer external electrodes to the termination electrodes, which increased the difficulty of forming the three-layer external electrodes.

For E1-1 to E1-14, E1-1 to E1-7 all adopted the ceramic material (7.5 weight percent), and had good connection between the internal electrodes and the termination electrodes without the defect of the interface separation between the termination electrodes and the ceramic body. E1-8 to E1-14 all adopted the ceramic material (11.25 weight percent), and did not have the defect of the interface separation between the termination electrodes and the ceramic body. However, E1-8 to E1-14 simply had an acceptable connection between the internal electrodes and the termination electrodes. Therefore, one may find that the amount of the ceramic material indeed affected the connection between the internal electrodes and the termination electrodes. In other words, the amount of the ceramic material of the termination electrode composite can be 7.5 weight percent to 11.25 weight percent, and 7.5 weight percent was preferred.

Further, E1-1 to E1-7 all had good continuity degree and good weldability degree of the three-layer external electrodes. In contrast, E1-8 to E1-14 simply had acceptable continuity degree and acceptable weldability degree of the three-layer external electrodes. Therefore, the amount of the ceramic material of the termination electrode composite can be 7.5 weight percent to 11.25 weight percent, and 7.5 weight percent was preferred. Finally, E1-1 to E1-14 all had good tensile strength of the capacitor.

For the sintering temperature of the co-sintering step, taking E1-1 to E1-7 in Table 2-3 as an example, E1-1 to 1-7 adopted the metal material with sequentially increasing amounts of copper, and adopted a co-sintering step with sequentially reducing sintering temperatures, and E1-1 to E1-7 all were classified as good finished products. Therefore, one may find that increasing the amount of copper for the metal material can reduce the sintering temperature of the co-sintering step, thereby reducing energy consumption.

To sum up, based on the total amount of the termination electrode composite, when the ceramic material was in an amount of 7.5 weight percent to 11.25 weight percent, the metal material was in an amount of 63.75 weight percent to 67.5 weight percent, the capacitor obtained by carrying out the co-sintering step of the present invention can have a tight connection between the termination electrodes and the ceramic body, and the finished product had a low COV of the capacitance value.

Further, according to the group of E1-1 to E1-7 or E1-8 to E1-14, one may find that the termination electrode composite of the present invention can adopt any type of a base metal material and any ratio of the base metals for an alloy, and can cooperate with (1) any base metal ingredient for the internal electrodes, (2) multiple types of the ceramic body composite; that is, the ceramic material of the termination electrode composite was not required to be the same as the ceramic ingredient of the ceramic body composite; and (3) multiple sintering temperatures of the co-sintering step.

IV. Comparative Example 2-1 to Comparative Example 2-6 (CE2-1 to CE2-6) and Example 2-1 to Example 2-6 (E2-1 to E2-6)

The main purpose of this experiment was to understand the feasible ranges of the amounts of both the ceramic material and the metal material for the termination electrode composite, under the condition that an alternative ceramic material of $(SrCa)(ZrTi)O_3$ was adopted for the termination electrode composite, which was the same as the ceramic ingredient of the ceramic body composite II, and was elaborated as follows:

1. CE2-1 to CE2-3: For the amount of the termination electrode composite, the differences between CE2-1 to CE2-3 and E1-1 were that all of CE2-1 to 2-3 adopted the ceramic material in an amount of 3.75 weight percent and the metal material in an amount of 71.25 weight percent.
2. E2-1 to E2-3: Both E2-1 to E2-3 and E1-1 comprised the same amount of the termination electrode composite, which the ceramic material was in an amount of 7.5 weight percent, and the metal material was in an amount of 67.5 weight percent.
3. E2-4 to E2-6: For the amount of the termination electrode composite, the differences between E2-4 to E2-6 and E1-1 were that all of E2-4 to E2-6 adopted the ceramic material in an amount of 11.25 weight percent and the metal material in an amount of 63.75 weight percent.
4. CE2-4 to CE2-6: For amount of the termination electrode composite, the differences between CE2-4 to CE2-6 and E1-1 were that all of CE2-4 to CE2-6 adopted the ceramic material in an amount of 15 weight percent, and the metal material in an amount of 60 weight percent.

Further, the type of the metal material of the termination electrode composite, the type of the metal ingredient of the internal electrodes, the ceramic body composite and the sintering temperature in the same group were further adjusted to observe whether such parameters will affect the analysis results of the capacitor. Therefore, the manufacturing methods of CE2-1 to CE2-6 and E2-1 to E2-6 were similar to that of E1-1; wherein the differences were (1) the type and the amount of the ceramic material of the termination electrode composite, (2) the type and the amount of the metal material of the termination electrode composite, (3) the metal ingredient of the internal electrodes, (4) the ceramic body composite, and (5) the sintering temperature, and were shown in Table 3-1. The analysis results of all groups were shown in Table 3-2 and Table 3-3.

TABLE 3-1 the amount of the ceramic material of the termination electrode composite (abbreviated as "amount of ceramic material"), the amount of the metal material of the termination electrode composite (abbreviated as "amount of metal material"), the type of the metal material of the termination electrode composite (abbreviated as "type of metal material"), the type of the metal ingredient of the internal electrodes (abbreviated as "metal ingredient"), the type of the ceramic body composite (abbreviated as "type of ceramic body"), and the sintering temperature of the co-sintering step (abbreviated as "sintering temperature") of CE2-1 to CE2-6 and E2-1 to E2-6

|  | Amount of ceramic material (weight percent) | Metal material Amount (weight percent) | Type | Metal ingredient | Type of ceramic body | Sintering temperature (° C.) |
|---|---|---|---|---|---|---|
| CE2-1 | 3.75 | 71.25 | Ni | Ni | II | 1350 |
| CE2-2 | 3.75 | 71.25 | Cu (45) Ni (55) | Ni | III | 1150 |
| CE2-3 | 3.75 | 71.25 | Cu | Cu | V | 950 |
| E2-1 | 7.5 | 67.5 | Ni | Ni | II | 1350 |
| E2-2 | 7.5 | 67.5 | Cu (45) Ni (55) | Ni | III | 1150 |
| E2-3 | 7.5 | 67.5 | Cu | Cu | V | 950 |
| E2-4 | 11.25 | 63.75 | Ni | Ni | II | 1350 |
| E2-5 | 11.25 | 63.75 | Cu (45) Ni (55) | Ni | III | 1150 |
| E2-6 | 11.25 | 63.75 | Cu | Cu | V | 950 |
| CE2-4 | 15.00 | 60.00 | Ni | Ni | II | 1350 |
| CE2-5 | 15.00 | 60.00 | Ni | Ni | III | 1150 |
| CE2-6 | 15.00 | 60.00 | Ni | Ni | V | 950 |

TABLE 3-2 the densification of the termination electrodes (abbreviated as "densification"), the condition of glass aggregation on the surface (abbreviated as "glass aggregation"), the condition of blisters (abbreviated as "blisters"), the cracking conditions of the ceramic body resulting from the overcontraction of the termination electrodes (abbreviated as "overcontraction") of CE2-1 to CE2-6 and E2-1 to E2-6

|  | Densification | Glass aggregation | Blisters | Overcontraction |
|---|---|---|---|---|
| CE2-1 | ○ | N | N | Y |
| CE2-2 | ○ | N | N | Y |
| CE2-3 | ○ | N | N | Y |
| E2-1 | ○ | N | N | N |
| E2-2 | ○ | N | N | N |
| E2-3 | ○ | N | N | N |
| E2-4 | ○ | N | N | N |
| E2-5 | ○ | N | N | N |
| E2-6 | ○ | N | N | N |
| CE2-4 | ○ | N | N | N |
| CE2-5 | ○ | N | N | N |
| CE2-6 | ○ | N | N | N |

According to Table 3-2, the analysis results of CE2-1 to CE2-6 and E2-1 to E2-6 were similar to those of CE1-8 to CE1-21 and E1-1 to E1-14. That is, all these groups had a good densification of the termination electrodes without the structural defects of the glass aggregation on the surface or blisters.

Further, CE2-1 to CE2-3 adopted a less amount of the ceramic material (3.75 weight percent), similar to those of CE1-8 to CE1-14, and had the cracking issues in the ceramic body resulting from the overcontraction of the termination electrodes, whereas none of the rest of the groups had the structural defects of the overcontraction of the termination electrodes.

Finally, according to all the analysis results of E2-1 to E2-6, the sintering agent of the green ceramic body indeed can flow to the green termination electrodes for facilitating a consolidation process during sintering, and the sintering agent is not required for the termination electrode composite of the present invention.

TABLE 3-3 the connection condition of the internal electrodes and the termination electrodes ("connection"), the interface separation condition between the termination electrodes and the ceramic body ("interface separation"), the continuity degree of the three-layer external electrodes ("continuity"), the weldability degree of the three-layer external electrodes ("weldability"), the tensile strength of the capacitor ("tensile strength"), and the coefficient of variation of the capacitance value ("COV") of CE2-1 to CE2-6 and E2-1 to E2-6

|  | Connection | Interface separation | Continuity | Weldability | Tensile strength (kgf) | COV (%) |
|---|---|---|---|---|---|---|
| CE2-1 | ○ | N | ○ | ○ | 1.14 | 1.4 |
| CE2-2 | ○ | N | ○ | ○ | 1.12 | 1.5 |
| CE2-3 | ○ | N | ○ | ○ | 1.15 | 1.3 |
| E2-1 | ○ | N | ○ | ○ | 2.13 | 1.3 |
| E2-2 | ○ | N | ○ | ○ | 2.11 | 1.4 |
| E2-3 | ○ | N | ○ | ○ | 2.15 | 1.5 |
| E2-4 | Δ | N | Δ | Δ | 2.33 | 2.3 |
| E2-5 | Δ | N | Δ | Δ | 2.34 | 2.4 |
| E2-6 | Δ | N | Δ | Δ | 2.31 | 2.7 |
| CE2-4 | X | N | X | X | 2.69 | 6.5 |
| CE2-5 | X | N | X | X | 2.66 | 6.3 |
| CE2-6 | X | N | X | X | 2.65 | 6.7 |

According to Table 3-3, the analysis results of CE2-1 to CE2-6 and E2-1 to E2-6 were similar to those of CE1-8 to CE1-21 and E1-1 to E1-14. That is, for the connection condition of the internal electrodes and the termination electrodes, the continuity degree and the weldability degree of the three-layer external electrodes, CE2-1 to CE2-3 and CE1-8 to CE1-14 all adopted the ceramic material in an amount of 3.75 weight percent, and E2-1 to E2-3 and E1-1 to E1-7 all adopted the ceramic material in an amount of 7.5 weight percent. Therefore, all these groups had good analysis results. Meanwhile, for the connection condition of the internal electrodes and the termination electrodes, the continuity degree and the weldability degree of the three-layer external electrodes, E2-4 to E2-6 and E1-8 to E1-14 all adopted the ceramic material in an amount of 11.25 weight percent, and simply had acceptable results. CE2-4 to CE2-6 and CE1-15 to CE1-21 all adopted the ceramic material in an amount of 15 weight percent, and all had failed results.

For the tensile strength of the capacitor, CE2-1 to CE2-3 and CE1-8 to CE1-14 all adopted the ceramic material in an amount of 3.75 weight percent, so CE2-1 to CE2-3 also had the cracking issues in the ceramic body resulting from the overcontraction of the termination electrodes. Therefore, the tensile strength of the capacitor thereof were significantly lower and were about half of those of E2-1 to E2-6 and CE2-4 to CE2-6.

To sum up, even an alternative ceramic material of (SrCa)(ZrTi)O₃ was adopted for the termination electrode composite of the present invention, based on the total amount of the termination electrode composite, both the ceramic material in an amount of 7.5 weight percent to 11.25 weight percent, and the metal material in an amount of 63.75 weight percent to 67.5 weight percent were preferred. Further, according to the analysis results of E2-2, E2-3, E2-5 and E2-6, the ceramic material of the termination electrode composite was not required to be the same as the ceramic ingredient of the ceramic body composite.

V. Comparative Example 3-1 to Comparative Example 3-6 (CE3-1 to CE3-6) and Example 3-1 to Example 3-6 (E3-1 to E3-6)

The main purpose of this experiment was to understand the feasible ranges of the amounts of both the ceramic material and the metal material for the termination electrode composite, under the condition that an alternative ceramic material of BaTiO₃ was adopted for the termination electrode composite, which was the same as the ceramic ingredient of the ceramic body composite III, and was elaborated as follows:

1. CE3-1 to CE3-3: For the amount of the termination electrode composite, the differences between CE3-1 to CE3-3 and E1-1 were that all of CE3-1 to CE3-3 adopted the ceramic material in an amount of 3.75 weight percent and the metal material in an amount of 71.25 weight percent.
2. E3-1 to E3-3: Both E3-1 to E3-3 and E1-1 comprised the same amount of the termination electrode composite, wherein the ceramic material was in an amount of 7.5 weight percent, and the metal material was in an amount of 67.5 weight percent.
3. E3-4 to E3-6: For the amount of the termination electrode composite, the differences between E3-4 to E3-6 and E1-1 were that all of E3-4 to E3-6 adopted the ceramic material in an amount of 11.25 weight percent and the metal material in an amount of 63.75 weight percent.
4. CE3-4 to CE3-6: For the amount of the termination electrode composite, the differences between CE3-4 to CE3-6 and E1-1 were that all of CE3-4 to CE3-6 adopted the ceramic material in an amount of 15 weight percent and the metal material in an amount of 60 weight percent.

Further, the type of the metal material of the termination electrode composite, the type of the metal ingredient of the internal electrodes, the ceramic body composite and the sintering temperature in the same group were further adjusted to observe whether such parameters will affect the analysis results of the capacitor. Therefore, the manufacturing methods of CE3-1 to CE3-6 and E3-1 to E3-6 were similar to that of E1-1; wherein the differences were (1) the type and the amount of the ceramic material of the termination electrode composite, (2) the type and the amount of the metal material of the termination electrode composite, (3) the metal ingredient of the internal electrodes, (4) the ceramic body composite, and (5) the sintering temperature, as shown in Table 4-1. The analysis results of all groups were shown in Table 4-2 and Table 4-3.

TABLE 4-1 the amount of the ceramic material of the termination electrode composite ("amount of ceramic material"), the amount of the metal material of the termination electrode composite ("amount of metal material"), the type of the metal material of the termination electrode composite ("type of metal material"), the type of the metal ingredient of the internal electrodes ("metal ingredient"), the type of the ceramic body composite ("type of ceramic body"), and the sintering temperature of the co-sintering step ("sintering temperature") of CE3-1 to CE3-6 and E3-1 to E3-6

| | Amount of ceramic material (weight percent) | Metal material | | Metal ingredient | Type of ceramic body | Sintering temperature (° C.) |
|---|---|---|---|---|---|---|
| | | Amount (weight percent) | Type | | | |
| CE3-1 | 3.75 | 71.25 | Ni | Ni | I | 1350 |
| CE3-2 | 3.75 | 71.25 | Cu (45) Ni (55) | Ni | III | 1150 |
| CE3-3 | 3.75 | 71.25 | Cu | Cu | IV | 950 |
| E3-1 | 7.5 | 67.5 | Ni | Ni | I | 1350 |
| E3-2 | 7.5 | 67.5 | Cu (45) Ni (55) | Ni | III | 1150 |
| E3-3 | 7.5 | 67.5 | Cu | Cu | IV | 950 |
| E3-4 | 11.25 | 63.75 | Ni | Ni | I | 1350 |
| E3-5 | 11.25 | 63.75 | Cu (45) Ni (55) | Ni | III | 1150 |
| E3-6 | 11.25 | 63.75 | Cu | Cu | IV | 950 |
| CE3-4 | 15.00 | 60.00 | Ni | Ni | I | 1350 |
| CE3-5 | 15.00 | 60.00 | Ni | Ni | III | 1150 |
| CE3-6 | 15.00 | 60.00 | Ni | Ni | IV | 950 |

TABLE 4-2 the densification of the termination electrodes ("densification"), the condition of glass aggregation on the surface ("glass aggregation"), the condition of blisters ("blisters"), and the cracking conditions of the ceramic body resulting from the overcontraction of the termination electrodes ("overcontraction") of CE3-1 to CE3-6 and E3-1 to E3-6

| | Densification | Glass aggregation | Blisters | Overcontraction |
|---|---|---|---|---|
| CE3-1 | ○ | N | N | Y |
| CE3-2 | ○ | N | N | Y |
| CE3-3 | ○ | N | N | Y |
| E3-1 | ○ | N | N | N |
| E3-2 | ○ | N | N | N |
| E3-3 | ○ | N | N | N |
| E3-4 | ○ | N | N | N |
| E3-5 | ○ | N | N | N |
| E3-6 | ○ | N | N | N |
| CE3-4 | ○ | N | N | N |
| CE3-5 | ○ | N | N | N |
| CE3-6 | ○ | N | N | N |

According to Table 4-2, the analysis results of CE3-1 to CE3-6 and E3-1 to E3-6 were similar to those of CE2-1 to CE2-6 and E2-1 to E2-6. That is, all these groups had a good densification of the termination electrodes without the structural defects of the glass aggregation on the surface or blisters. Further, CE3-1 to CE3-3 adopted a less amount of the ceramic material (3.75 weight percent), and had cracking in the ceramic body resulting from the overcontraction of the termination electrodes, whereas none of the rest of the groups had the structural defects of the overcontraction of the termination electrodes. Finally, according to all the analysis results of E3-1 to E3-6, the sintering agent of the green ceramic body indeed can flow to the green termination electrodes for facilitating a consolidation process during sintering, and the sintering agent is not required for the termination electrode composite of the present invention.

TABLE 4-3 the connection condition of the internal electrodes and the termination electrodes ("connection"), the interface separation condition between the termination electrodes and the ceramic body ("interface separation"), the continuity degree of the three-layer external electrodes ("continuity"), the weldability degree of the three-layer external electrodes ("weldability"), the tensile strength of the capacitor ("tensile strength"), and the coefficient of variation of the capacitance value ("COV") of CE3-1 to CE3-6 and E3-1 to E3-6

| | Connection | Interface separation | Continuity | Weldability | Tensile strength (kgf) | COV (%) |
|---|---|---|---|---|---|---|
| CE3-1 | ○ | N | ○ | ○ | 1.15 | 1.6 |
| CE3-2 | ○ | N | ○ | ○ | 1.10 | 1.5 |
| CE3-3 | ○ | N | ○ | ○ | 1.13 | 1.3 |
| E3-1 | ○ | N | ○ | ○ | 2.10 | 1.4 |
| E3-2 | ○ | N | ○ | ○ | 2.11 | 1.5 |
| E3-3 | ○ | N | ○ | ○ | 2.13 | 1.4 |
| E3-4 | Δ | N | Δ | Δ | 2.36 | 2.1 |
| E3-5 | Δ | N | Δ | Δ | 2.33 | 2.1 |
| E3-6 | Δ | N | Δ | Δ | 2.31 | 2.1 |
| CE3-4 | X | N | X | X | 2.66 | 6.3 |
| CE3-5 | X | N | X | X | 2.64 | 6.4 |
| CE3-6 | X | N | X | X | 2.61 | 6.6 |

According to Table 4-3, the analysis results of CE3-1 to CE3-6 and E3-1 to E3-6 were similar to those of CE2-1 to CE2-6 and E2-1 to E2-6. That is, even an alternative ceramic material of $BaTiO_3$ was adopted for the termination electrode composite of the present invention, based on the total amount of the termination electrode composite, both the ceramic material in an amount of 7.5 weight percent to 11.25 weight percent, and the metal material in an amount of 63.75 weight percent to 67.5 weight percent were preferred. Further, according to the analysis results of E3-1, E3-3, E3-4 and E3-6, the ceramic material of the termination electrode composite was not required to be the same as the ceramic ingredient of the ceramic body composite.

VI. Comparative Example 4-1 to Comparative Example 4-6 (CE4-1 to CE4-6) and Example 4-1 to Example 4-6 (E4-1 to E4-6)

The main purpose of this experiment was to understand the feasible ranges of the amounts of both the ceramic material and the metal material for the termination electrode composite, under the condition that an alternative ceramic material of $Ba_2Ti_9O_{20}$ was adopted for the termination electrode composite, which was different from any of the ceramic ingredients of the ceramic body composites I to V, elaborated as follows:

1. CE4-1 to CE4-3: For the amount of the termination electrode composite, the differences between CE4-1 to CE4-3 and E1-1 were that all of CE4-1 to CE4-3 adopted the ceramic material in an amount of 3.75 weight percent and the metal material in an amount of 71.25 weight percent.
2. E4-1 to E4-3: Both E4-1 to E4-3 and E1-1 comprised the same amount of the termination electrode composite, wherein the ceramic material was in an amount of 7.5 weight percent, and the metal material was in an amount of 67.5 weight percent.
3. E4-4 to E4-6: For the amount of the termination electrode composite, the differences between E4-4 to E4-6 and E1-1 were that all of E4-4 to E4-6 adopted the ceramic material in an amount of 11.25 weight percent and the metal material in an amount of 63.75 weight percent.

4. CE4-4 to CE4-6: For the amount of the termination electrode composite, the differences between CE4-4 to CE4-6 and E1-1 were that all of CE4-4 to CE4-6 adopted the ceramic material in an amount of 15 weight percent, and the metal material in an amount of 60 weight percent.

Further, the type and the amount of the metal material of the termination electrode composite, the type of the metal ingredient of the internal electrodes, the ceramic body composite and the sintering temperature in the same group were further adjusted to observe whether such parameters would affect the analysis results of the capacitor. Therefore, the manufacturing methods of CE4-1 to CE4-6 and E4-1 to E4-6 were similar to that of E1-1; wherein the differences were (1) the type and the amount of the ceramic material of the termination electrode composite, (2) the type and the amount of the metal material of the termination electrode composite, (3) the metal ingredient of the internal electrodes, (4) the ceramic body composite, and (5) the sintering temperature, as shown in Table 5-1. The analysis results of all groups were shown in Table 5-2 and Table 5-3.

TABLE 5-1 the amount of the ceramic material of the termination electrode composite ("amount of ceramic material"), the amount of the metal material of the termination electrode composite ("amount of metal material"), the type of the metal material of the termination electrode composite ("type of metal material"), the type of the metal ingredient of the internal electrodes ("metal ingredient"), the type of the ceramic body composite ("type of ceramic body"), and the sintering temperature of the co-sintering step ("sintering temperature") of CE4-1 to CE4-6 and E4-1 to E4-6

| | Amount of ceramic material (weight percent) | Metal material | | Metal ingredient | Type of ceramic body | Sintering temperature (° C.) |
|---|---|---|---|---|---|---|
| | | Amount (weight percent) | Type | | | |
| CE4-1 | 3.75 | 71.25 | Ni | Ni | II | 1350 |
| CE4-2 | 3.75 | 71.25 | Cu (45) Ni (55) | Ni | III | 1150 |
| CE4-3 | 3.75 | 71.25 | Cu | Cu | IV | 950 |
| E4-1 | 7.5 | 67.5 | Ni | Ni | II | 1350 |
| E4-2 | 7.5 | 67.5 | Cu (45) Ni (55) | Ni | III | 1150 |
| E4-3 | 7.5 | 67.5 | Cu | Cu | IV | 950 |
| E4-4 | 11.25 | 63.75 | Ni | Ni | II | 1350 |
| E4-5 | 11.25 | 63.75 | Cu (45) Ni (55) | Ni | III | 1150 |
| E4-6 | 11.25 | 63.75 | Cu | Cu | IV | 950 |
| CE4-4 | 15.00 | 60.00 | Ni | Ni | II | 1350 |
| CE4-5 | 15.00 | 60.00 | Ni | Ni | III | 1150 |
| CE4-6 | 15.00 | 60.00 | Ni | Ni | IV | 950 |

TABLE 5-2 the densification of the termination electrodes ("densification"), the condition of glass aggregation on the surface ("glass aggregation"), the condition of blisters ("blisters"), the cracking conditions of the ceramic body resulting from the overcontraction of the termination electrodes ("overcontraction") of CE4-1 to CE4-6 and E4-1 to E4-6

| | Densification | Glass aggregation | Blisters | Overcontraction |
|---|---|---|---|---|
| CE4-1 | ○ | N | N | Y |
| CE4-2 | ○ | N | N | Y |
| CE4-3 | ○ | N | N | Y |
| E4-1 | ○ | N | N | N |
| E4-2 | ○ | N | N | N |
| E4-3 | ○ | N | N | N |
| E4-4 | ○ | N | N | N |
| E4-5 | ○ | N | N | N |
| E4-6 | ○ | N | N | N |
| CE4-4 | ○ | N | N | N |
| CE4-5 | ○ | N | N | N |
| CE4-6 | ○ | N | N | N |

According to Table 5-2, the analysis results of CE4-1 to CE4-6 and E4-1 to E4-6 were similar to those of both the group of CE2-1 to CE2-6 and E2-1 to E2-6 and the group of CE3-1 to CE3-6 and E3-1 to E3-6. That is, all these groups had a good densification of the termination electrodes without the structural defects of the glass aggregation on the surface or blisters. Further, CE4-1 to CE4-3 adopted a less amount of the ceramic material (3.75 weight percent), and had cracking in the ceramic body resulting from the overcontraction of the termination electrodes, whereas none of the rest of the groups had the structural defects of the overcontraction of the termination electrodes. Therefore, the sintering agent of the green ceramic body indeed can flow to the green termination electrodes for facilitating a consolidation process during sintering, and the sintering agent is not required for the termination electrode composite of the present invention.

TABLE 5-3 the connection condition of the internal electrodes and the termination electrodes ("connection"), the interface separation condition between the termination electrodes and the ceramic body ("interface separation"), the continuity degree of the three-layer external electrodes ("continuity"), the weldability degree of the three-layer external electrodes ("weldability"), the tensile strength of the capacitor ("tensile strength"), and the coefficient of variation of the capacitance value ("COV") of CE4-1 to CE4-6 and E4-1 to E4-6

| | Connection | Interface separation | Continuity | Weldability | Tensile strength (kgf) | COV (%) |
|---|---|---|---|---|---|---|
| CE4-1 | ○ | N | ○ | ○ | 1.15 | 1.5 |
| CE4-2 | ○ | N | ○ | ○ | 1.13 | 1.6 |
| CE4-3 | ○ | N | ○ | ○ | 1.15 | 1.5 |
| E4-1 | ○ | N | ○ | ○ | 2.16 | 1.3 |
| E4-2 | ○ | N | ○ | ○ | 2.13 | 1.3 |
| E4-3 | ○ | N | ○ | ○ | 2.19 | 1.5 |
| E4-4 | Δ | N | Δ | Δ | 2.34 | 2.1 |
| E4-5 | Δ | N | Δ | Δ | 2.33 | 2.1 |
| E4-6 | Δ | N | Δ | Δ | 2.36 | 2.4 |
| CE4-4 | X | N | X | X | 2.65 | 6.8 |
| CE4-5 | X | N | X | X | 2.69 | 6.2 |
| CE4-6 | X | N | X | X | 2.60 | 6.3 |

According to Table 5-3, the analysis results of CE4-1 to CE4-6 and E4-1 to E4-6 were similar to those of both the group of CE2-1 to CE2-6 and E2-1 to E2-6 and the group of CE3-1 to CE3-6 and E3-1 to E3-6. Therefore, even an alternative ceramic material of $Ba_2Ti_9O_{20}$, which was different from any of the ceramic ingredient of the ceramic body composites I to V, was adopted for the termination electrode composite of the present invention, based on the total amount of the termination electrode composite, both the ceramic material in an amount of 7.5 weight percent to 11.25 weight percent, and the metal material in an amount of 63.75 weight percent to 67.5 weight percent were preferred. Further, the ceramic material of the termination electrode composite indeed was not required to be the same as the ceramic ingredient of the ceramic body composite.

VII. Example 5-1 to Example 5-8 (E5-1 to E5-8)

The main purpose of this experiment was to understand (1) for the termination electrode composite, the feasible types and ranges of the amounts of the resin, and the feasible ranges of the amounts of the organic solvent, and (2) the feasible preparation method for the green termination electrodes. Therefore, the manufacturing methods of E5-1 to E5-8 were similar to that of E1-7, wherein (1) the termination electrode composites thereof all comprised the same ceramic material of $BaTi_4O_9$ in an amount of 7.5 weight percent, and the same metal material of copper in an amount of 67.5 weight percent, and (2) the differences thereof were as follows: (A) the types and the amounts of the resin of the termination electrode composite, (B) the amounts of the organic solvent of the termination electrode composite, (C) the sintering temperature, and (D) the preparation method for the green termination electrodes, comprising the process of screen printing, dipping and rolling, for further observing whether such parameters will affect the results of manufacturing method thereof. The details of E5-1 to E5-8 were shown in Table 6-1 and elaborated as follows:

1. E5-1 to E5-3: the difference between E5-1 to E5-3 and E1-7 were that all of E5-1 to E5-3 adopted (1) screen printing process for preparing the green termination electrodes, (2) the resin of ethyl cellulose in an amount of 1.5 weight percent to 2.5 weight percent, and (3) the organic solvent in an amount of 22.5 weight percent to 23.5 weight percent.
2. E5-4 to E5-6: the differences between E5-4 to E5-6 and E1-7 were that all of E5-4 to E5-6 adopted (1) the resin in an amount of 5 weight percent to 9 weight percent, and (2) the organic solvent in an amount of 16 weight percent to 20 weight percent.
3. E5-7 to E5-8: the differences between E5-7 to E5-8 and E1-7 were that all of E5-7 to E5-8 adopted (1) rolling process for preparing the green termination electrodes, (2) the resin in an amount of 9 weight percent to 11 weight percent, and (3) the organic solvent in an amount of 14 weight percent to 16 weight percent.

Further, as the adjustment of the amounts of the organic solvent would change the viscosity of the termination electrode composite, the viscosity measured by a rotary viscometer at 10 rpm was provided in Table 6-1, unit: kilo counts per second (Kcps).

TABLE 6-1 the type of the resin of the termination electrode composite ("type of resin"), the amount of the resin of the termination electrode composite (abbreviated as "amount of resin"), the amount of the organic solvent of the termination electrode composite ("amount of organic solvent"), the viscosity of the termination electrode composite ("viscosity"), and the preparation method for the green termination electrodes ("preparation method") of E5-1 to E5-8

| | Resin | | Amount of organic solvent (weight percent) | Viscosity (Kcps) | preparation method |
|---|---|---|---|---|---|
| | Type | Amount (weight percent) | | | |
| E5-1 | ethyl cellulose | 1.5 | 23.5 | 83 | screen printing |
| E5-2 | ethyl cellulose | 2 | 23 | 110 | screen printing |
| E5-3 | ethyl cellulose | 2.5 | 22.5 | 165 | screen printing |
| E5-4 | poly(methyl methacrylate) | 5 | 20 | 80 | dipping |
| E5-5 | poly(methyl methacrylate) | 7 | 18 | 55 | dipping |
| E5-6 | poly(methyl methacrylate) | 9 | 16 | 40 | dipping |
| E5-7 | poly(methyl methacrylate) | 9 | 16 | 40 | rolling |
| E5-8 | poly(methyl methacrylate) | 11 | 14 | 25 | rolling |

The appearances of the green termination electrodes obtained during the manufacturing of E5-1 to E5-8 were flat and smooth without defects such as sharp protrusions or drooping. Further, none of E5-1 to 5-3 had the problem that the termination electrode composite stuck to the screen during screen printing. Therefore, the green termination electrodes obtained during the manufacturing of E5-1 to E5-8 facilitated manufacturing of the capacitor. Therefore, one may find that the termination electrode composite of the present invention can adopt (1) different types of resin, which was ethyl cellulose or poly(methyl methacrylate), (2) the resin in an amount of 1.5 weight percent to weight percent, (3) the organic solvent in an amount of 14 weight percent to 23.5 weight percent, and (4) the preparation method for the green termination electrodes, which comprised the process of screen printing, dipping or rolling. For clarification, the resin and the organic solvent will be removed from the burning out step, so the type and the amount of the resin and the organic solvent will not affect efficacy of the finished product.

To sum up, the manufacturing method for a multilayer ceramic electronic component adopts a co-sintering step: heating the green body, i.e., heating the green ceramic body and the green termination electrodes simultaneously, and has the advantages of simplifying the manufacturing process and being cost-effective.

Further, when the termination electrode composite adopts a particular range of the amounts of both the ceramic material and the metal material without a glass material as a sintering agent, the multilayer ceramic electronic component obtained by using the same still has good densification of the termination electrodes, and the termination electrodes are free of the issues of (1) glass aggregation on the surface, (2) blisters, (3) cracking in the ceramic body resulting from the overcontraction of the termination electrodes, and (4) interface separation between the termination electrodes and the ceramic body. Further, the multilayer ceramic electronic component or the finished product thereof has the advantages as follows: (1) good connection between the internal electrodes and the termination electrodes, (2) good continuity degree and good weldability degree of the three-layer external electrodes, (3) high tensile strength of the capacitor, (4) low COV of the capacitance value, which warrants a high production yield rate and high reliability.

What is claimed is:

1. A termination electrode composite, comprising a ceramic material, a metal material, a resin and an organic solvent, wherein based on a total amount of the termination electrode composite, the ceramic material is in an amount of weight percent to 12 weight percent, the metal material is in an amount of 63 weight percent to 71 weight percent, the resin is in an amount of 1.3 weight percent to 11.5 weight percent, and the organic solvent is in an amount of 13 weight percent to 25 weight percent.

2. The termination electrode composite as claimed in claim 1, wherein the ceramic material comprises barium titanium oxide, calcium zirconium oxide or a combination thereof.

3. The termination electrode composite as claimed in claim 2, wherein the barium titanium oxide comprises $BaTiO_3$, $BaTi_4O_9$, $Ba_2Ti_9O_{20}$ or any combination thereof.

4. The termination electrode composite as claimed in claim 2, wherein the calcium zirconium oxide comprises $(SrCa)(ZrTi)O_3$, $CaZrO_3$ or a combination thereof.

5. The termination electrode composite as claimed in claim 1, wherein the metal material comprises a base metal material.

6. The termination electrode composite as claimed in claim 1, wherein the resin comprises an acrylic resin, an ethyl cellulose resin or a combination thereof.

7. The termination electrode composite as claimed in claim 1, wherein the organic solvent comprises an alcohol, an ether, an ester, an aromatic hydrocarbon or any combination thereof.

8. The termination electrode composite as claimed in claim 1, wherein the ceramic material has a median particle size (D50) of 50 nm to 1000 nm.

9. The termination electrode composite as claimed in claim 1, wherein the metal material is in a form of particles, and the metal material has a median particle size (D50) of 0.5 μm to 10 μm.

10. The termination electrode composite as claimed in claim 1, wherein the metal material is in a form of flakes, and the metal material has a longest diameter of 2 μm to 10 μm.

11. A multilayer ceramic electronic component, comprising:
a ceramic body, comprising a top ceramic layer and a stacked structure with ceramic-electrode alternating layers;
wherein the top ceramic layer is disposed on top of the stacked structure with ceramic-electrode alternating layers, and the stacked structure with ceramic-electrode alternating layers comprises multiple ceramic-electrode layers stacked on each other, and
the multiple ceramic-electrode layers each comprise a middle ceramic layer and an internal electrode, and the internal electrode is disposed on top of the middle ceramic layer; and
two termination electrodes, respectively disposed on opposite sides of the ceramic body,
wherein the two termination electrodes electrically connect to the internal electrode of the multiple ceramic-electrode layers; and
the two termination electrodes each comprise a ceramic material, a metal material and a glass material, and based on the total amount of any one of the two termination electrodes, the metal material is in an amount of 83.5 weight percent to 93 weight percent, the ceramic material is in an amount of 6.5 weight percent to 16 weight percent, and the glass material is in an amount of more than 0 weight percent to less than 3 weight percent.

12. A manufacturing method for a multilayer ceramic electronic component, comprising:
a preparation step for a green ceramic body: shaping a ceramic slurry into multiple green ceramic thin layers, and the multiple green ceramic thin layers comprising a top green ceramic layer and multiple middle green ceramic layers; wherein the ceramic slurry comprises a ceramic body composite, and the ceramic body composite comprises a ceramic ingredient and a sintering agent;
disposing a green internal electrode on top of each of the middle green ceramic layers respectively to obtain multiple green ceramic-electrode layers;
stacking the multiple green ceramic-electrode layers to obtain a green stacked structure with ceramic-electrode alternating layers;
disposing the top green ceramic layer on top of the green stacked structure with ceramic-electrode alternating layers to obtain the green ceramic body;
a step for disposing green termination electrodes: disposing a termination electrode composite as claimed in claim 1 on opposite sides of the green ceramic body respectively to form the green termination electrodes, thereby obtaining a green body; and
a co-sintering step: heating the green body at 900° C. to 1400° C. to obtain the multilayer ceramic electronic component.

13. The manufacturing method as claimed in claim 12, wherein the ceramic ingredient of the ceramic body composite comprises barium titanium oxide, calcium zirconium oxide or a combination thereof.

14. The manufacturing method as claimed in claim 12, wherein the ceramic ingredient of the ceramic body composite is the same as or different from the ceramic material of the termination electrode composite.

15. The manufacturing method as claimed in claim 12, wherein the co-sintering step comprises a burning out step and a sintering step.

16. The manufacturing method as claimed in claim 15, wherein the burning out step comprises heating the green body at 300° C. to 400° C. for 10 hours to 14 hours to obtain a primary body; and the sintering step comprises heating the primary body at 900° C. to 1400° C. for 1 hour to 3 hours to obtain the multilayer ceramic electronic component.

17. The manufacturing method as claimed in claim 12, wherein the green internal electrode is disposed on top of each of the middle green ceramic layers in continuous patterns, discontinuous patterns or floating patterns.

* * * * *